United States Patent
Parks et al.

(10) Patent No.: US 6,575,067 B2
(45) Date of Patent: Jun. 10, 2003

(54) TABLE SAW

(75) Inventors: James Parks, Timonium, MD (US); Robert S. Gehret, Hampstead, MD (US); Scott Livingston, Catonsville, MD (US); Michael L. O'Banion, Westminster, MD (US); Robert P. Welsh, Hunt Valley, MD (US); William Scott Taylor, Glen Rock, PA (US); Todd L. Huston, Lutherville, MD (US); Edwin G. Zehr, Taneytown, MD (US); Scott Stropkay, Carlisle, MA (US); David Louis Weissburg, Cambridge, MA (US); Mark Allen Nichols, Cambridge, MA (US); William R. Stumpf, Kingsville, MD (US); Lewis Hampton Rohr, Fayetteville, NC (US); Henry Louis Tew, Fayetteville, NC (US); Thomas S. Paladino, Naperville, IL (US); Paul Eichelberger, Landisville, PA (US); David Edmund Duncanson, W. Newbury, MA (US); Jerry Wayne Holleman, Apex, NC (US); Adan Ayala, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/194,825

(22) Filed: Jul. 12, 2002

(65) Prior Publication Data

US 2002/0194971 A1 Dec. 26, 2002

Related U.S. Application Data

(63) Continuation of application No. 09/328,614, filed on Jun. 9, 1999, now abandoned, which is a continuation-in-part of application No. 09/213,466, filed on Dec. 17, 1998, now abandoned.

(60) Provisional application No. 60/074,706, filed on Feb. 13, 1998.

(51) Int. Cl.$^7$ .............................................. B23D 45/06
(52) U.S. Cl. ..................... 83/435.27; 83/474; 83/477.2; 144/287
(58) Field of Search .......................... 83/477.2, 435.12, 83/435.13, 475.14, 437.1, 437.2, 474, 435.27; 144/287

(56) References Cited

U.S. PATENT DOCUMENTS

| | | | | |
|---|---|---|---|---|
| 3,695,189 A | * | 10/1972 | Felder, Jr. ..................... | 108/65 |
| 4,561,336 A | * | 12/1985 | Davis ........................... | 83/859 |
| 4,860,807 A | * | 8/1989 | Vacchiano ............... | 144/286.1 |
| 4,934,423 A | * | 6/1990 | Withrow ................ | 144/286.1 |
| 5,201,863 A | * | 4/1993 | Peot ............................ | 83/432 |
| 5,230,269 A | * | 7/1993 | Shiotani et al. ............ | 83/468.7 |
| 5,320,150 A | * | 6/1994 | Everts et al. ................ | 144/287 |
| 5,363,893 A | * | 11/1994 | Grochowicz ................ | 144/287 |
| 5,526,856 A | * | 6/1996 | Pedri ........................... | 144/287 |
| 6,112,785 A | * | 9/2000 | Yu .............................. | 144/287 |

* cited by examiner

Primary Examiner—Kenneth E. Peterson
(74) Attorney, Agent, or Firm—Adan Ayala

(57) ABSTRACT

A table saw including a base, a main table supported by the base, first and second rails attached to the table, a sliding table fixedly attached to the rails and sliding along the longitudinal axis of the rails and a cross-cut table slidably movable in a direction perpendicular to the longitudinal axis of the rails. The cross-cut table may be adjusted to ensure movement parallel to a blade protruding from the main table. An improved miter gauge assembly is also disclosed. An improved fence assembly is further disclosed herein. In addition, a table saw having an improved panel and leg construction is disclosed herein.

9 Claims, 23 Drawing Sheets

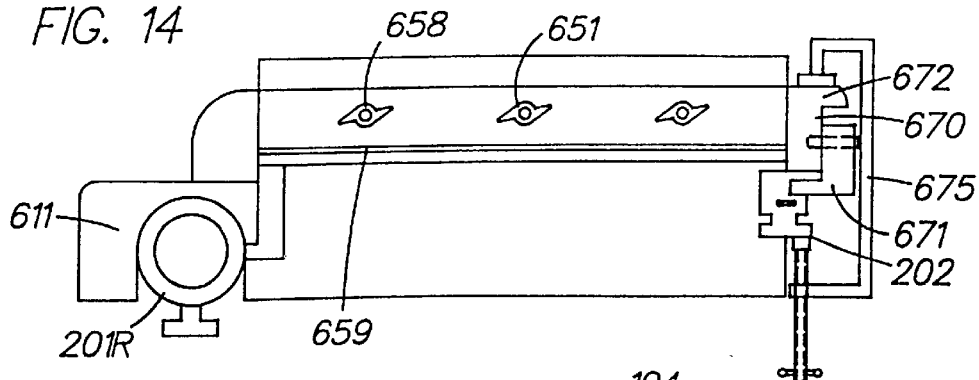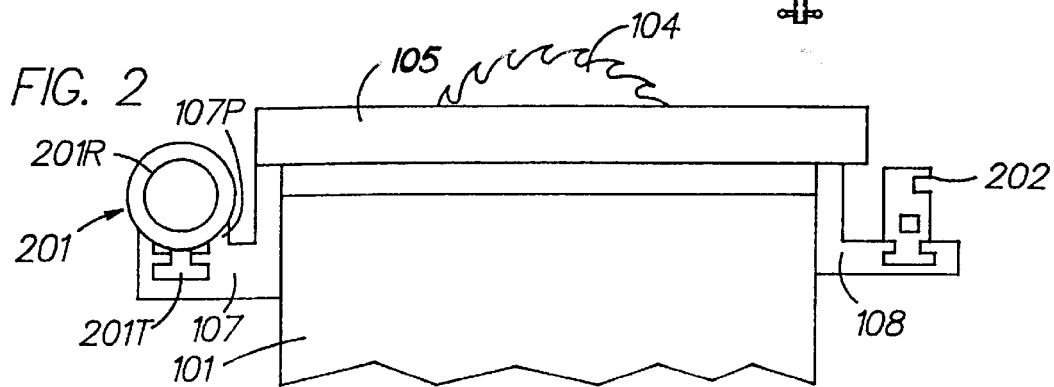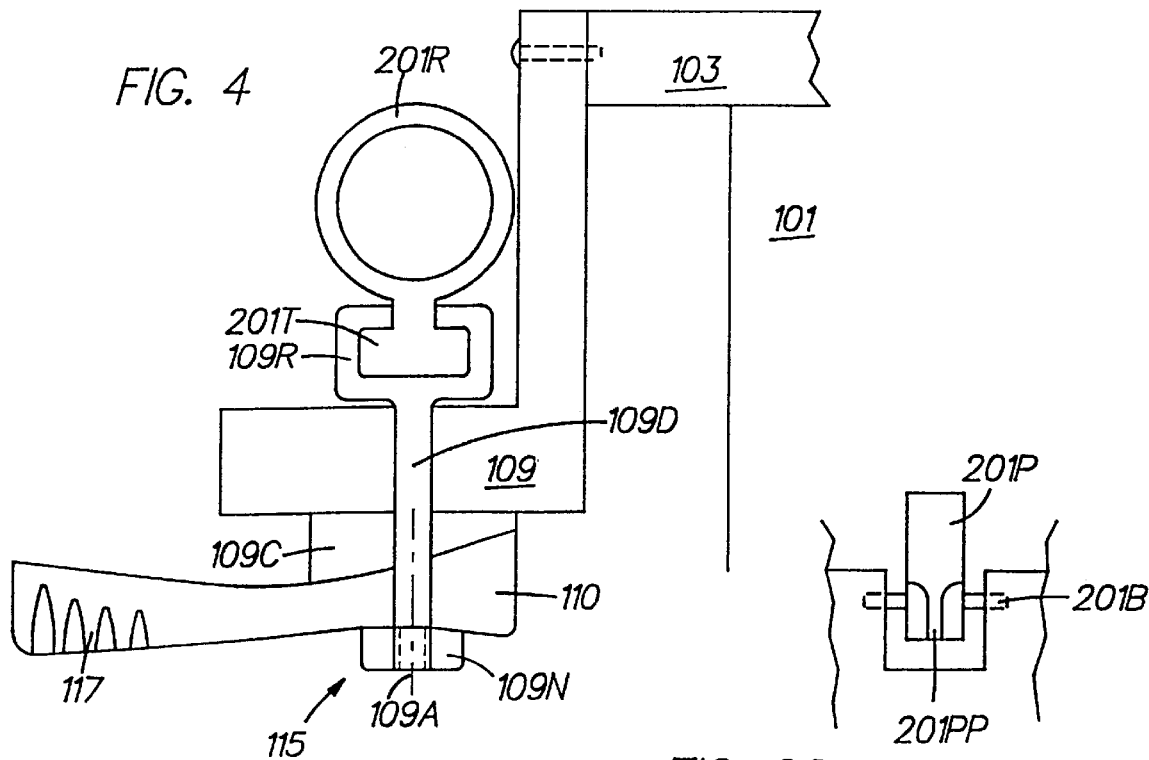

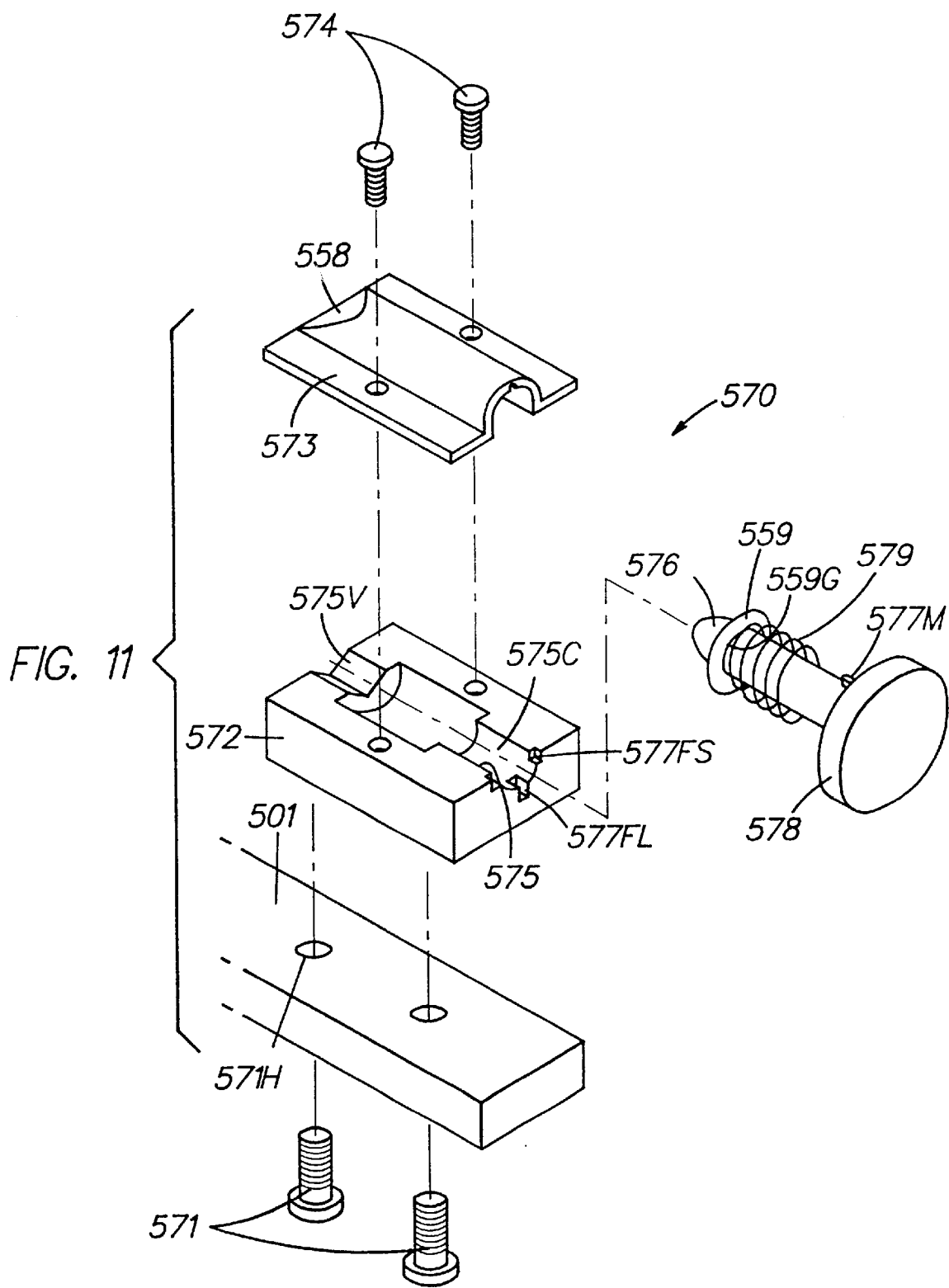

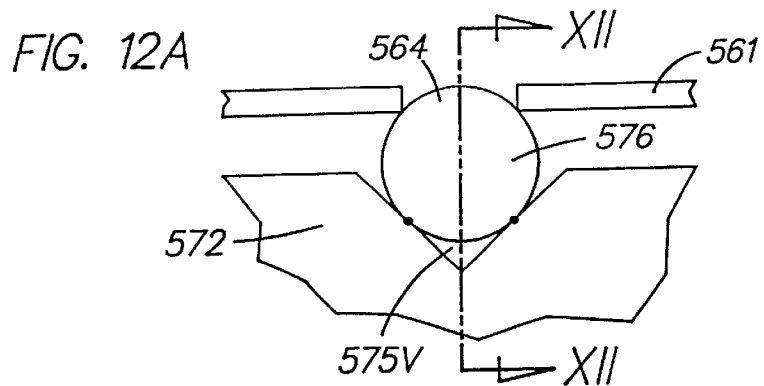
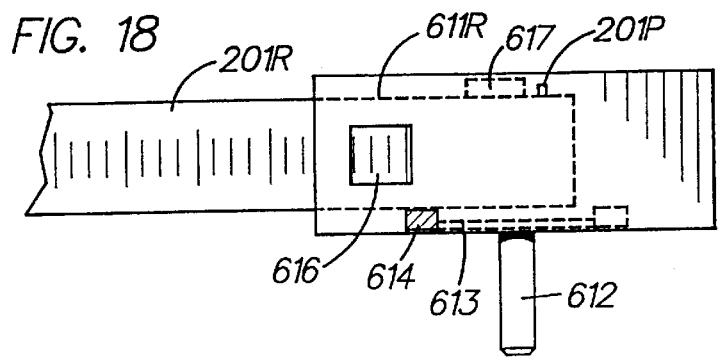
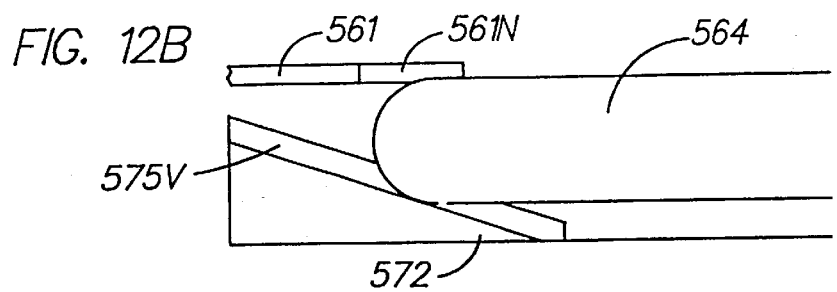
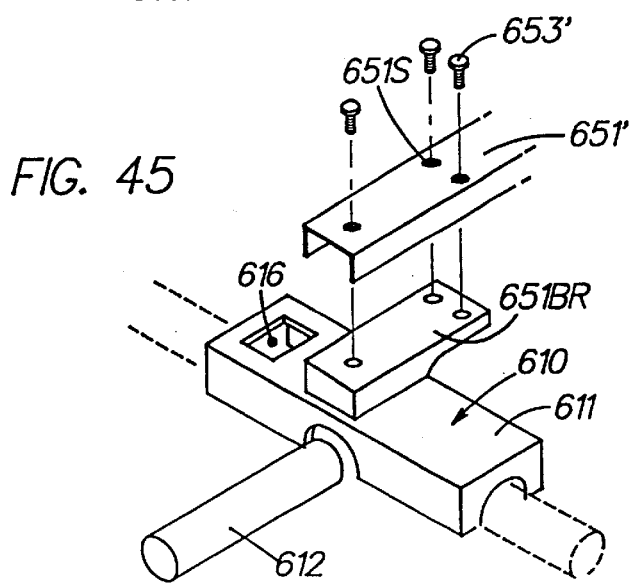

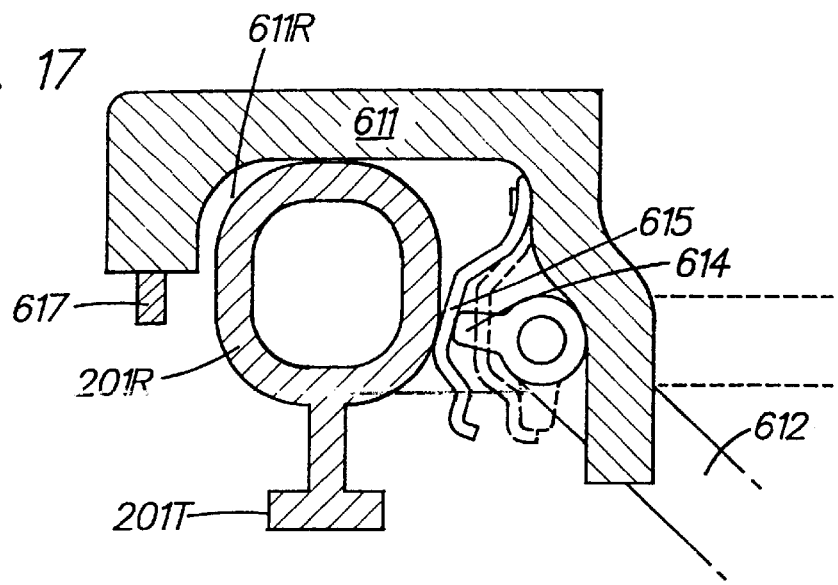
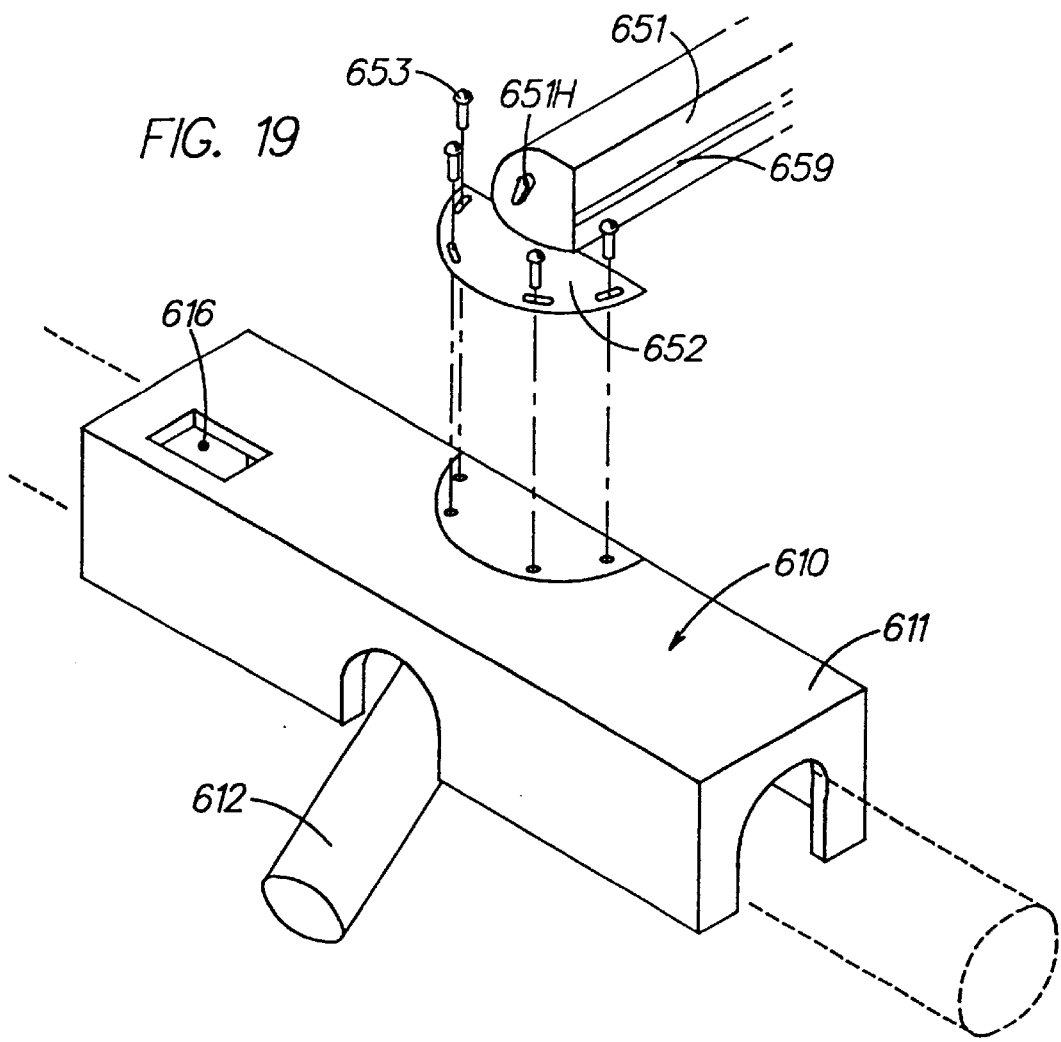

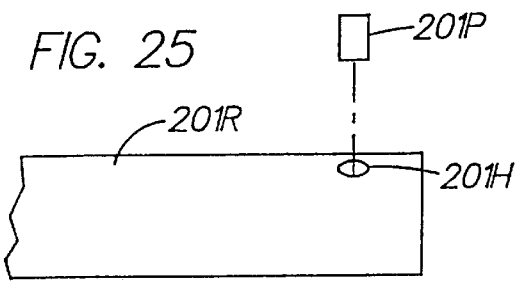
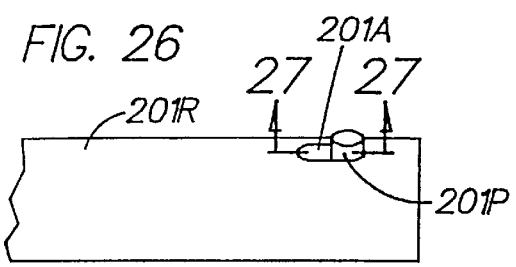
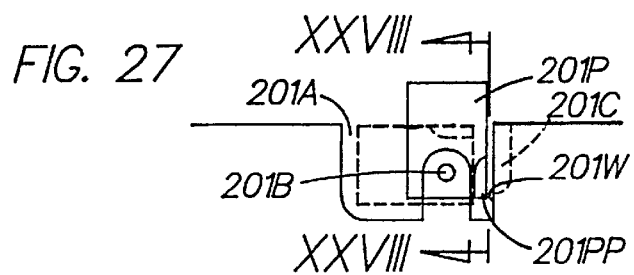
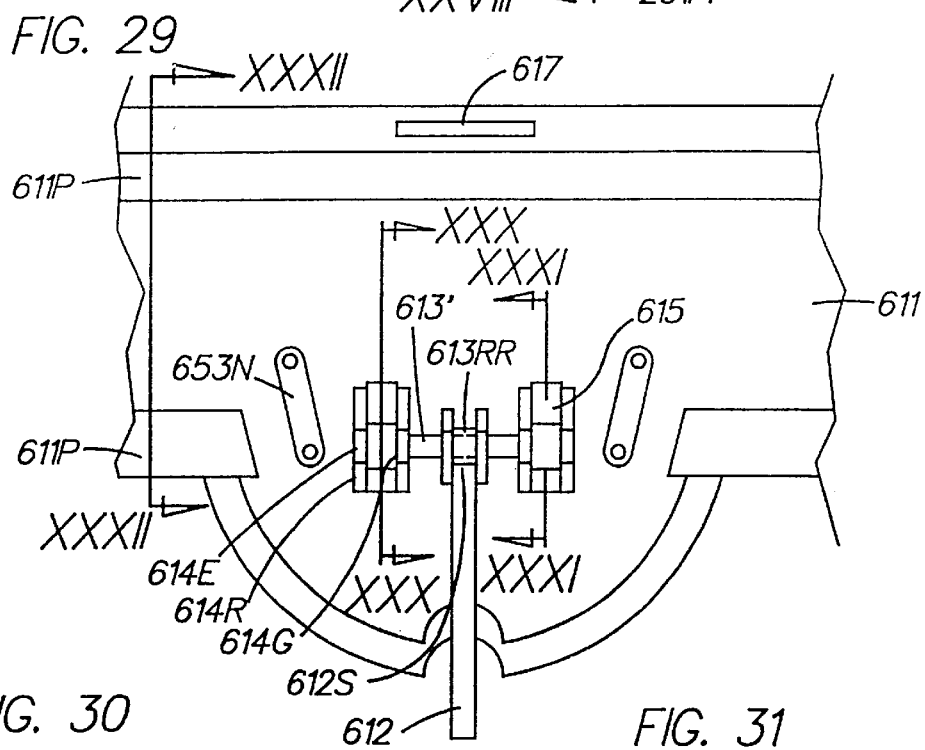
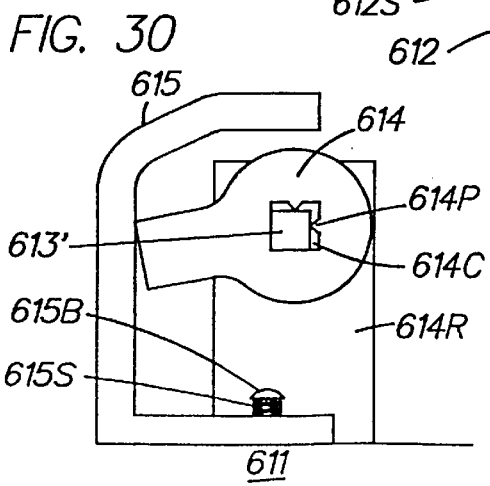
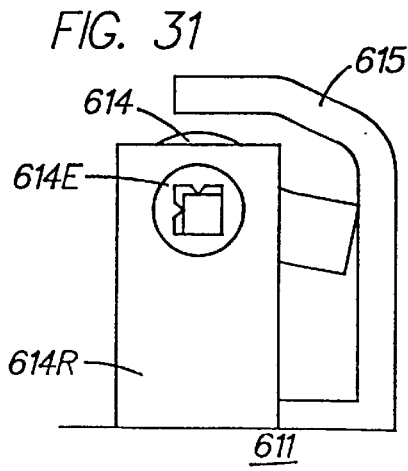

TABLE SAW

CROSS-REFERENCE TO RELATED APPLICATIONS

The following application is a continuation of U.S. application Ser. No. 09/328,614, filed on Jun. 9, 1999, now abandoned, which in turn is a continuation-in-part of U.S. application Ser. No. 09/213,466, filed Dec. 17, 1998, now abandoned, which derives priority from U.S. Application No. 60/074,706, filed Feb. 13, 1998, now abandoned.

FIELD OF THE INVENTION

This invention relates generally to table saws.

BACKGROUND OF THE INVENTION

Generally, a table saw for cutting work pieces has a circular saw table for supporting a circular saw, on one side of which a miter table having a miter gauge for guiding a workpiece to be cut is provided, and on the other side of which a supplementary table for supporting the workpiece to be cut is provided. A fence for determining the cutting width of the workpiece is also provided in the table saw.

However, the common prior art arrangements have several problems. For example, the supplementary table of the conventional table saw is fixed to a working table. Typically, the size of the supplementary table determines the support capacity of the table saw. In other words, if the supplementary table is very large, it can support a large workpiece. This is problematic as the large size of the supplementary table normally requires a large space, which is at a premium in a workshop. Conversely, a smaller supplementary table requires less space, but also reduces the size of the workpiece which can be adequately supported. The lack of reliable support can then cause inaccurate cuts, which may translate into loss of time, materials and/or profit for the user.

Also, while some miter tables can be moved in the front and rear directions as viewed from an operator, these arrangements require special assemblies which extend beyond the envelope of the table saw, making transportation of the table saw difficult and requiring extra space in a workshop. In addition, these miter table saw assemblies can impede the use of the saw for ripping. Other movable miter tables are problematic as they cannot be easily and accurately leveled in order to remain within the same plane of the main saw table. This also causes inaccurate cuts.

Other causes of undesirable inaccurate cuts reside in the accessories used on table saws. For example, most miter gauges have primitive detent systems which rely on two elements coming into contact. However, because of the design and/or construction, these miter gauges have a certain amount of "play." Accordingly, while a miter gauge may read an angle of 30°, because of the play involved between the elements, the actual angle may be off by several degrees. Again, this discrepancy between the reading and the actual angle causes inaccurate cuts.

Similarly, fences sliding along parallel rails are common in the prior art. However, because of the materials, design and/or construction of the fences and/or rails, the fences do not lock consistently parallel to the blade, requiring carefully adjustment and wasting operator time. Other fences change their positions during the locking operation. This forces the user to adjust and lock the fence multiple times until the fence is properly positioned, again wasting operator time. Otherwise, they would cause inaccurate cuts.

It is an object of this invention to provide a table saw which can overcome these prior art problems.

SUMMARY OF THE INVENTION

In accordance with the present invention, an improved table saw is employed. The table saw comprises a base assembly comprising a base and a table supported by the base, first and second rails slidably attached to the base assembly, the rails being slidable in a first direction, and a sliding table fixedly attached to the first and second rails, the sliding table being slidable in the first direction.

Also disclosed is a table saw comprising a base assembly comprising a base and a table supported by the base, a first rail attached to the base assembly, the first rail having a longitudinal axis, and a cross-cut table slidably attached to the first rail, the cross-cut table being slidable in a direction perpendicular to the longitudinal axis of the rail. A second rail attached to the base assembly and connected to the cross-cut table may also be provided.

Further disclosed is a cross-cut table assembly comprising first and second rails having longitudinal axis, and a cross-cut table slidably attached to the first and second rails, the cross-cut table being slidable in a direction perpendicular to the longitudinal axis of the rail. A subpanel may be disposed on the first and second rails. At least one slide assembly is fixedly disposed between the subpanel and the cross-cut table.

Also disclosed is a table saw comprising a base assembly comprising a base and a table supported by the base, first and second rails attached to the base assembly, the first and second rails having a longitudinal axis, a subpanel disposed to the first and second rails, and a cross-cut table slidably attached to the subpanel, the cross-cut table being slidable in a direction perpendicular to the longitudinal axis of the rails. At least one screw is disposed between the first rail and the subpanel. Accordingly, the height of the cross-cut table may be adjusted by adjusting the screw.

Further disclosed is a table saw comprising a base assembly comprising a base and a table supported by the base, first and second rails slidably attached to the base assembly, the first and second rails having a longitudinal axis, and a cross-cut table slidably attached to the first and second rails, the cross-cut table being slidable in a sliding direction perpendicular to the longitudinal axis of the rails. The sliding direction can be angularly adjusted to be parallel to the blade by sliding the first and second rails relative to the base assembly.

Also disclosed is a miter gauge having a guide bar, a miter head assembly rotatably attached to the guide bar, a detent plate slidably attached to the miter head and a scale plate slidably attached to the miter head and the detent plate.

Further disclosed is a miter gauge having a guide bar, a miter head assembly rotatably attached to the guide bar, a detent plate slidably attached to the miter head, and a latch assembly attached to the guide bar. The latch assembly has a channel and a slidable pin sliding along the channel and engaging the detent plate. The total number of lines of contact between the detent plate and the pin and between the channel and the pin is less than infinity and preferably between 3 and 10.

Also disclosed is a saw comprising a base assembly comprising a base and a table supported by the base, a miter groove disposed in the table, and a miter gauge lock assembly adjacent to the miter groove for locking a miter gauge disposed in the miter groove. The miter gauge lock assembly comprises a lock plate disposed adjacent to the miter groove, a threaded shaft contacting the lock plate and threadedly engaged to threads disposed within the base assembly, and a knob connected to the threaded shaft for rotating the threaded shaft.

Further disclosed is a fence assembly comprising a fence head and a fence beam rotatably connected to the fence head, allowing rotational adjustment of the fence beam relative to the fence head.

Also disclosed is a fence assembly comprising a fence beam and a fence head connected to the fence beam. The fence head comprises a main body, a rod having two ends and rotatably connected to the main body, and a cam disposed at each end of the rod, and a handle connected to the rod, where movement of the handle causes rotation of the cams.

Further disclosed is a table saw comprising a base assembly comprising a base and a table supported by the base, a first rail attached to the base assembly, a fence assembly slidably disposed on the table and on the rail, the fence comprising a fence beam and a fence head connected to the fence beam. The fence head comprises a main body disposed on the rail, a rod having two ends and rotatably connected to the main body, and a cam disposed at each end of the rod and adjacent to the rail, and a handle connected to the rod, where movement of the handle causes rotation of the cams, securely holding the position the fence assembly on the rail.

Also disclosed is a table saw comprising a base assembly comprising a base and a table supported by the base, a fence assembly slidably disposed on the table, the fence assembly comprising a fence beam and a fence head connected to the fence beam, a plurality of notches disposed on the base assembly, and a latch assembly disposed on the fence assembly engageable to one of the notches. Preferably, the plurality of notches are disposed on a detent plate attached to the base assembly. The detent plate may be slidably attached to the base assembly. The latch assembly has a slidable pin sliding along a hole in the fence assembly and engaging one of the notches. The total number of lines of contact between one of the notches and the pin and between the hole and the pin is less than infinity and preferably between 3 and 10. A scale plate may be slidably attached to the base assembly and the detent plate.

Further disclosed is a table saw comprising a base assembly comprising a base and a table supported by the base, a fence assembly slidably disposed on the base assembly, the fence comprising a fence beam and a fence head connected to the fence beam. The fence head comprises a main body and a protrusion disposed on the main body. The base assembly comprises at least one movable stop, the stop being movable between a first position engaging the protrusion and a second position clearing the protrusion. The stop may be removable or pivotable to achieve the first and second positions.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 2 is a cross-sectional view of the table saw of FIG. 1 along line II—II;

FIG. 4 is a partial cross-sectional view of the table saw of FIG. 1 along line IV—IV;

FIG. 11 is a partial exploded view of a pin assembly of the miter gauge assembly of FIG. 5;

FIG. 12A is a partial cross-sectional view of the miter gauge assembly of FIG. 5 along line XII—XII as shown in FIG. 9;

FIG. 12B is a partial cross-sectional view along line XII—XII as shown in FIG. 12A;

FIG. 13 shows a miter gauge lock assembly, where

FIG. 14 is a partial cross-sectional and right elevational view of the table saw of FIG. 1 along line XIV—XIV;

FIG. 17 is a cross-sectional view of the fence head assembly along line XVII—XVII in FIG. 15;

FIG. 18 is a partial top plan view of the fence head assembly of FIG. 16;

FIG. 19 is a partial exploded view of a fence assembly shown in FIG. 14;

FIG. 25 illustrates a removable stop on a rail;

FIG. 26 illustrates a pivotable stop on a rail;

FIG. 27 is a detailed side view of the pivotable stop of FIG. 26;

FIG. 28 is a detailed view of the pivotable stop along line XXVIII—XXVIII of FIG. 27;

FIG. 29 is a bottom plan view of a second embodiment of the fence head assembly;

FIG. 30 is a partial cross-sectional view along line XXX—XXX of FIGS. 29 and 44;

FIG. 31 is a partial cross-sectional view along line XXXI—XXXI of FIGS. 29 and 44;

FIG. 45 is an exploded view of an alternate embodiment of the fence beam assembly;

DETAILED DESCRIPTION

Figure 1:
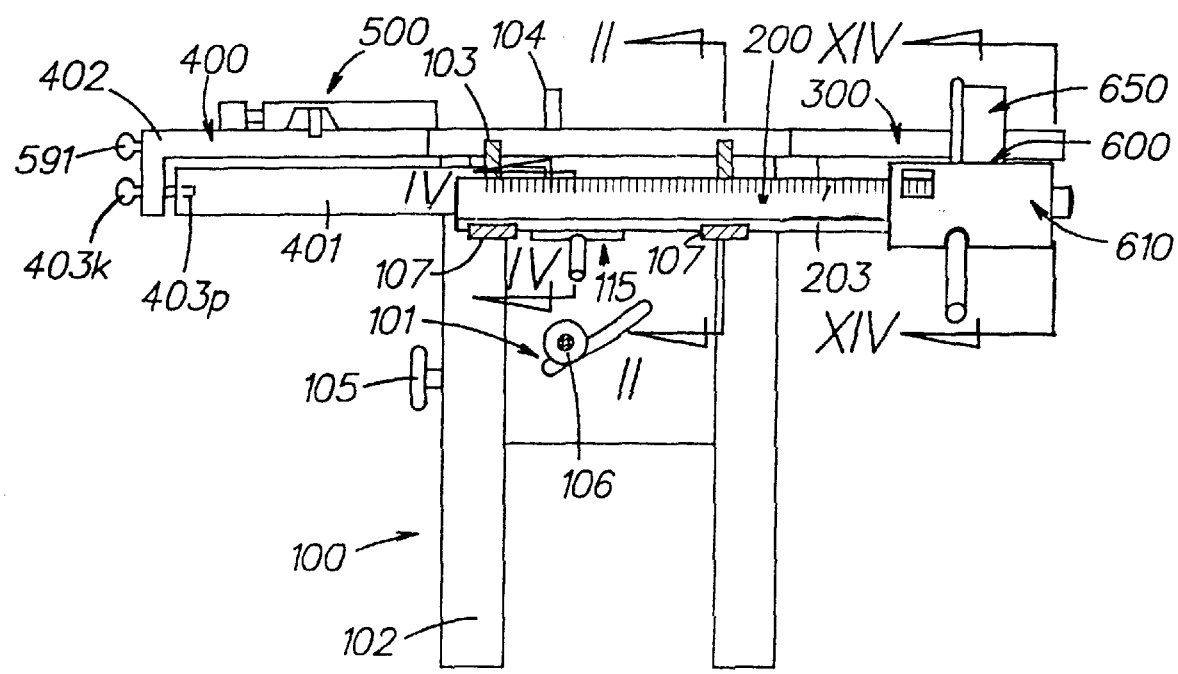
FIG. 1 is a front elevational view of an exemplary table saw according to the present invention.

The invention is now described with reference to the accompanying figures, wherein like numerals designate like parts. Referring to FIG. 1, an exemplary table saw may have the following major components: a base assembly 100 which includes a sliding rail assembly 200 slidably connected to the base assembly 100, a sliding table 300 connected to the sliding rail assembly 200, a cross-cut table assembly 400, a miter gauge assembly 500 and a fence assembly 600 slidably disposed on the sliding rail assembly 200.

Base Assembly 100

The base assembly 100 may have a table 103, legs 102 connected to and supporting the table 103 and panels 101 connected to the legs 102. Inside the base assembly 100, a blade assembly (not shown) may be disposed in such manner that a blade 104 protrudes through a slot in the table 103. Preferably, the blade 104 is offset from the center of table 103. In this manner, rip capacity has been effectively increased without increasing the envelope of table 103.

A bevel crank 105 may be provided in order to adjust the angular position of the blade assembly and thus of the blade 104 relative to the table 103. Similarly, a height crank 106 may be provided in order to adjust the vertical position of the blade assembly and thus the height of the blade 104 relative to the table 103.

Figure 37:
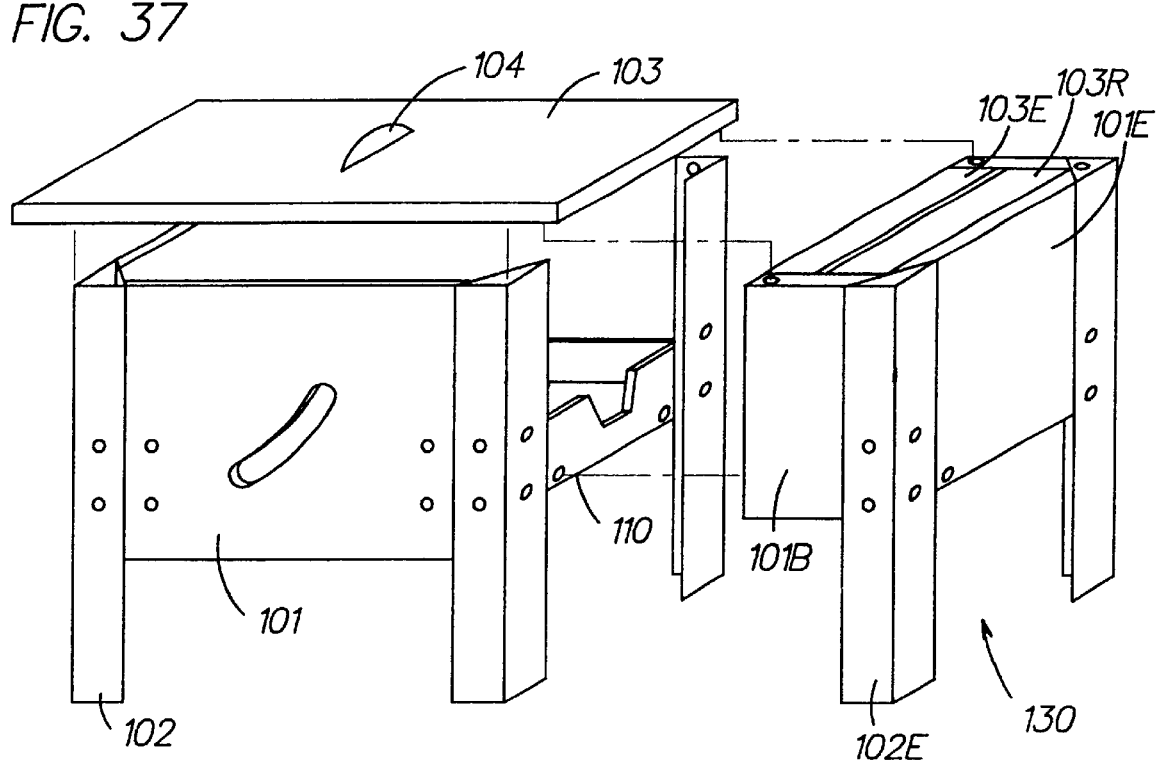
FIG. 37 is an exploded view of a second embodiment of the base assembly.
Figure 35:
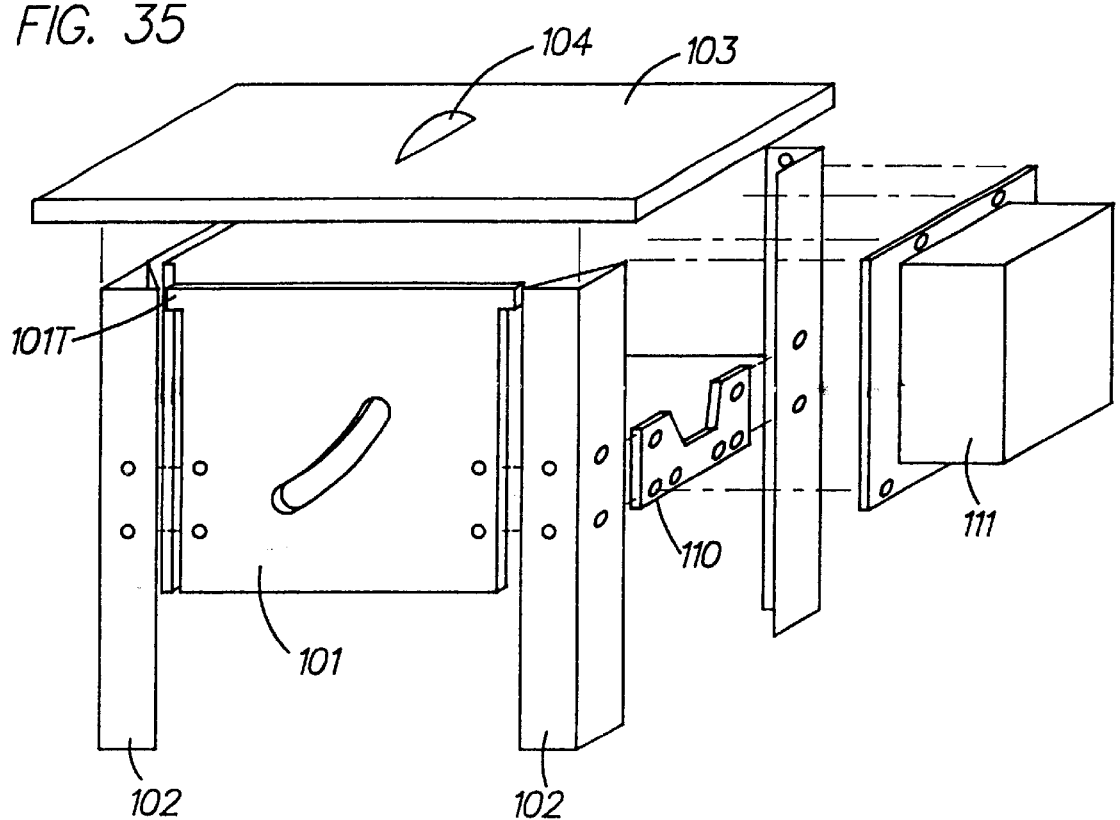
FIG. 35 is an exploded view of the base assembly.
Figure 36:
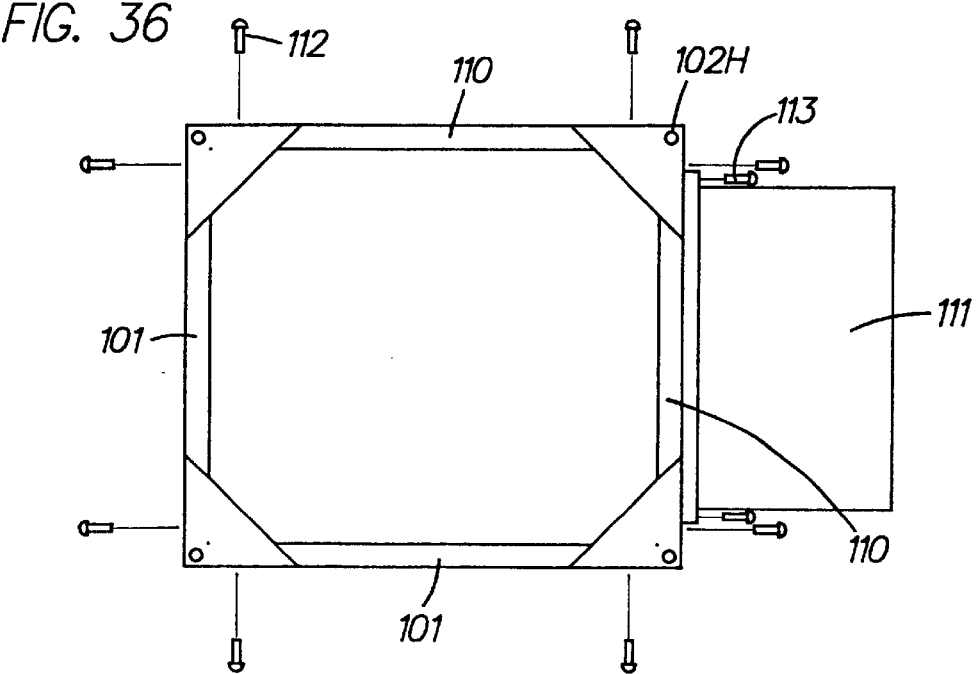
FIG. 36 is a partial top plan view of the base assembly.

Referring to FIGS. 35–37, the legs 102 are constructed by folding sheet metal and overlapping the top corners. Each corner has a hole 102H to allow a screw to extend therethrough and threadingly engage the table 103.

The panels 101 are connected to the legs 102 via screws 112. The panels 101 may also have a tab 101T with a hole matching hole 102H. This allows connection of the panels 101 to the table 103 using the same screw used to connect the legs 102 to the table 103.

A cross-bar 110 may be used instead of panels 101. The cross-bar 110 is connected to the legs 102 via screws 112 in a similar manner as the panels 101. The cross-bar 110, however, is not connected to the table 103.

It may also be preferable to provide a cover 111. The cover 111 is connected to the cross-bar 110 via screws 113. It is also preferable to screw the cover 111 to table 103.

Referring to FIG. 37, an extension assembly 130 is attached to the base assembly 100 and table 103 in a similar manner to the cover 111. The extension assembly 130 includes legs 102E, which may be constructed in the same manner as legs 102. Connected to the legs 102E are extension panels 101E. An extension table 103E is disposed between and connected to the front and rear extension panels 101E. At least one screw may connect the extension table 103E to the underside of table 103, or to a discrete attachment connected to the table 103. It may be preferable to create a space 103R between the side extension panel and the extension table 103E. A user can then place a router, a grinder, etc., in this space, if so desired.

The above-described arrangement of the base assembly 100 is advantageous for several reasons. First, the base assembly 100 is easy to assemble. In addition, by having separate legs, panels and/or cross-bars, the entire base assembly can be compactly packaged and shipped.

Sliding Rail Assembly 200 and Sliding Table 300

As mentioned above, the sliding rail assembly 200 is slidably connected to the base assembly 100. Referring to FIGS. 1 and 2, the sliding rail assembly 200 may include a front rail 201 and a rear rail 202. As seen in FIG. 2, the front rail 201 may have a upper round section 201R and a lower inverted-T rail 201T fixedly attached to the upper section 201R and preferably extending throughout most of the length, if not the entire length, of the front rail 201.

The lower rail 201T is slidably received by at least one front rail bracket 107, which may be in turn fixedly attached to the table 103. Thus, the front rail bracket 107 slidably supports the front rail 201. As shown in FIG. 2, the front rail bracket 107 has upwardly protrusions 107P that contact front rail 201. The two-point contact between the bracket 107 and the front rail 201 ensure alignment.

The rear rail 202, preferably made of extruded aluminum, may be slidably received by at least one rear rail bracket 108, which may be in turn fixedly attached to the table 103.

A sliding table 300 may be fixedly attached to both front and rear rails 201, 202. Accordingly, a user may be able to extend the envelope of the table saw as shown in FIG. 3 by just pulling on the sliding table 300 and sliding rail assembly 200.

Figure 3:
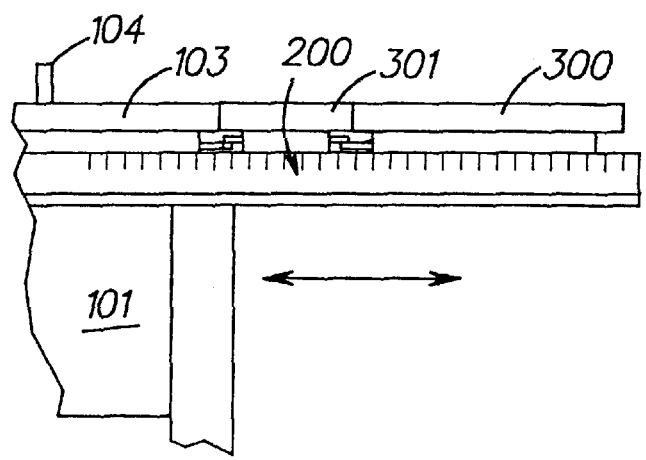
FIG. 3 is a partial front elevational view of a sliding table of the table saw of FIG. 1.

As shown in FIG. 3, a filler table 201 may be disposed between sliding table 300 and table 103. The filler table 301 may be supported by the sliding rail assembly 200, the sliding table 300 and/or the base assembly 100.

Referring to FIGS. 1 and 4, a locking cam assembly 115 may be used in order to lock the sliding rail assembly 200 and/or the sliding table 300 in the desired position. Basically, the locking cam assembly 115 may include a front rail support 109 fixedly attached to the table 103. The rail support 109 includes a receiving portion 109R slidably receiving the lower rail 201T. The receiving portion 109R has a downwardly-extending portion 109D extending through the rail support 109 and connected to a nut 109N. The locking cam assembly may also include a cam 116 connected to a handle 117. The cam 116 is disposed between nut 109N and a cam portion 109C. Accordingly, in order to prevent movement of the front rail 201, the user need only to rotate handle 117 about axis 109A, forcing the receiving portion 109R to move along axis 109A as the cam 116 and cam portion 109C become disaligned. The lower rail 201T is thus locked because of the downwardly force created by the receiving portion 109R.

Rail Assembly 120

Figure 49:
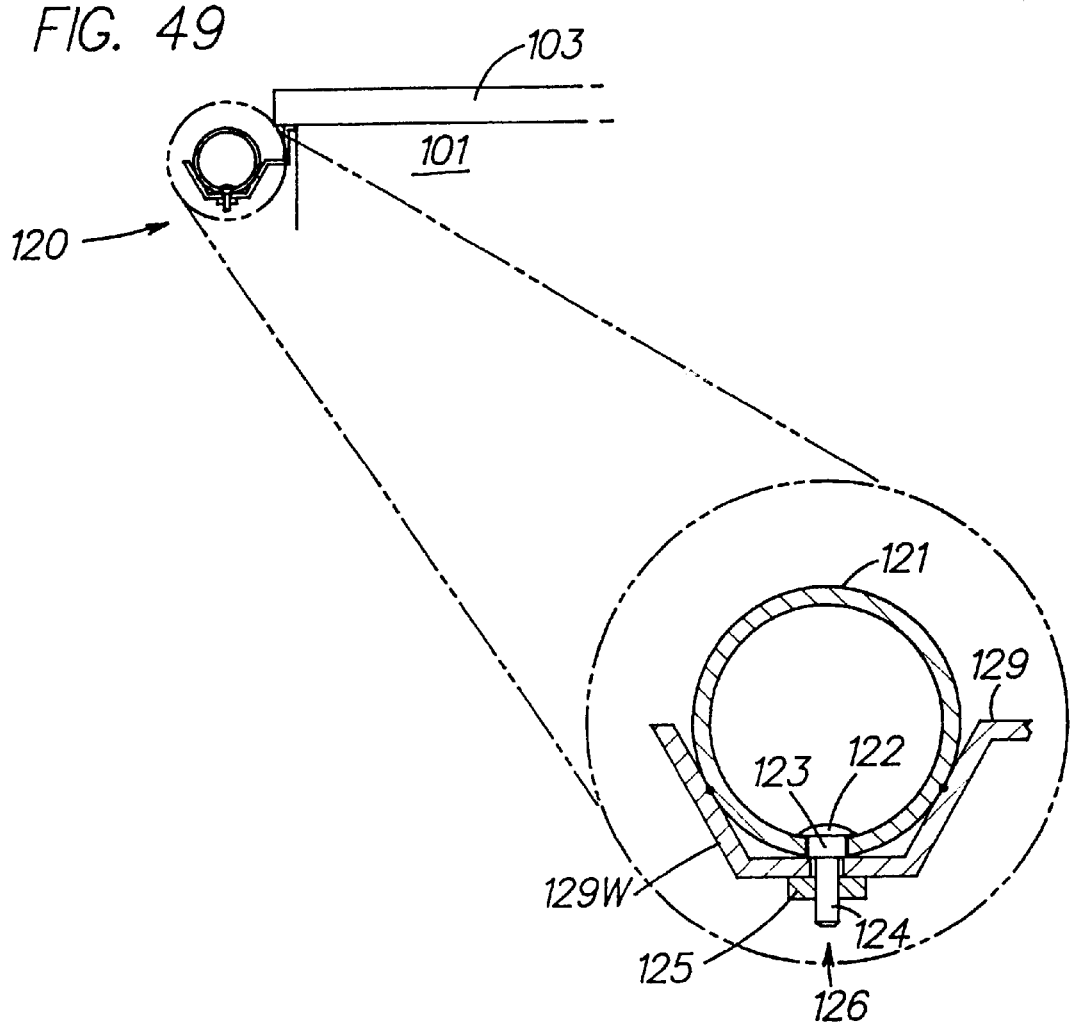
FIG. 49 is a partial cross-sectional view, similar to that of FIG. 2, of a table saw with an alternate rail assembly, and further including a close-up view of the connection of the alternate rail assembly.
Figure 50A:
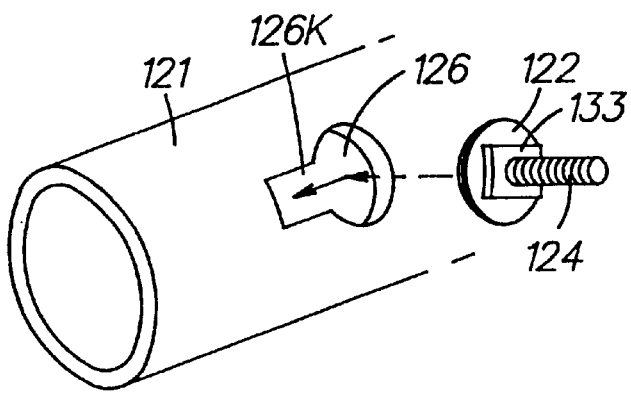
FIGS. 50A and 50B illustrate a step for assembling the alternate rail assembly of FIG. 49.
Figure 50B:
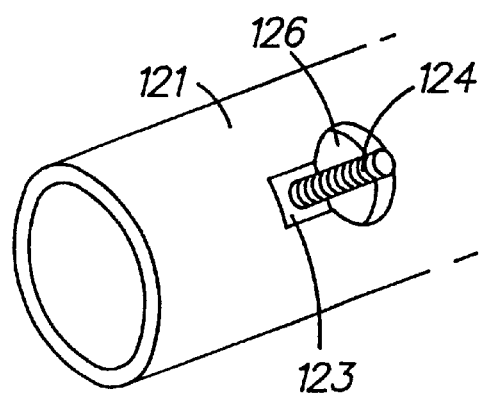

An alternate embodiment of rail assembly 200 is shown in FIGS. 49–50, where like numerals refer to like parts. The rail assembly 120 may include a front rail 121. Preferably front rail 121 has a circular cross-section. Front rail 121 may be fixedly attached to at least one front rail bracket 129, which in turn may be fixedly attached to the table 103 and/or base assembly 100. Preferably front rail bracket 129 has side walls 129W contacting the sides of front rail 121.

A bolt 126 is used to fixedly attach the rail 121 to bracket 129. Preferably bolt 126 has a head 122 which is disposed on the inside of rail 121 and a threaded portion 124 extending through rail 121 and bracket 129. A nut 125 is threadingly disposed on threaded portion 124.

The bolt 126 may also have a key potion 123 disposed between the head 122 and the threaded portion 124. Key portion 123 engages a keyed notch 126K disposed on the underside of rail 121, as shown in FIG. 50, so that the user need not hold the bolt 126 while tightening nut 125. Preferably the notch 126K is part of hole 126, which allows the user to insert head 122 therethrough, and move the key portion 123 into notch 126K.

Cross-Cut Table Assembly 400

A cross-cut table assembly 400 is also provided. Referring to FIGS. 1 and 5–8, the cross-cut table assembly 400 may include two auxiliary rails 401 fixedly attached to the base 101 or table 103 via screws 410. The cross-cut table assembly 400 may also include a sliding cross-cut table 402 slidably disposed on the auxiliary rails 401. The cross-cut table 402 slides towards the front and/or the rear of the table saw, i.e., in a direction parallel to the plane which the blade 104 resides therein.

Preferably, the top surface of table 402 is coplanar with or slightly above the top surface of table 103. Accordingly, it is also preferable to provide a means for adjusting the height of the table 402. An exemplary means includes providing a set of screws 407 on the auxiliary rails 401. A subpanel 405 is disposed on top of the auxiliary rails 401. The subpanel 405 may have slots 407s which slidingly engage the screws 407 to limit movement along the longitudinal axis of the auxiliary rails 401. However, the combination of the screws 407 and the slots 407s do not limit vertical movement of the subpanel 405.

Figure 6:
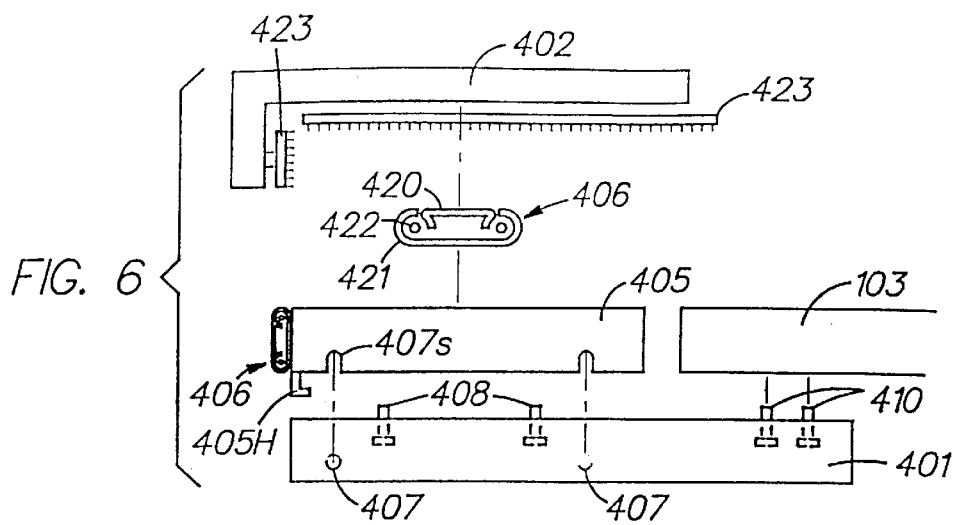
FIG. 6 is an exploded front elevational view of the cross-cut table assembly of FIG. 5.
Figure 7:
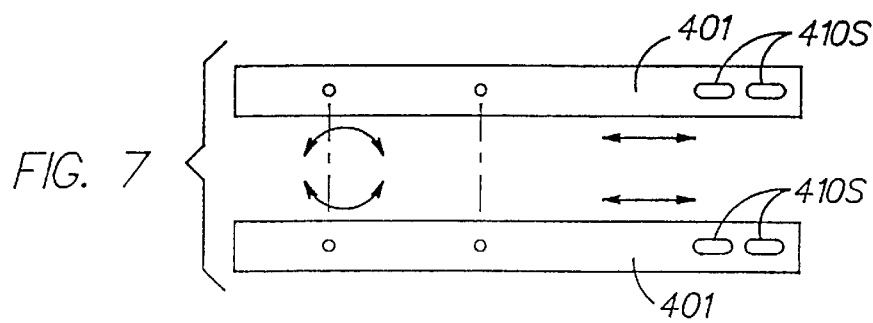
FIG. 7 is a schematic diagram of rails connected to the cross-cut table assembly of FIG. 5.
Figure 8:
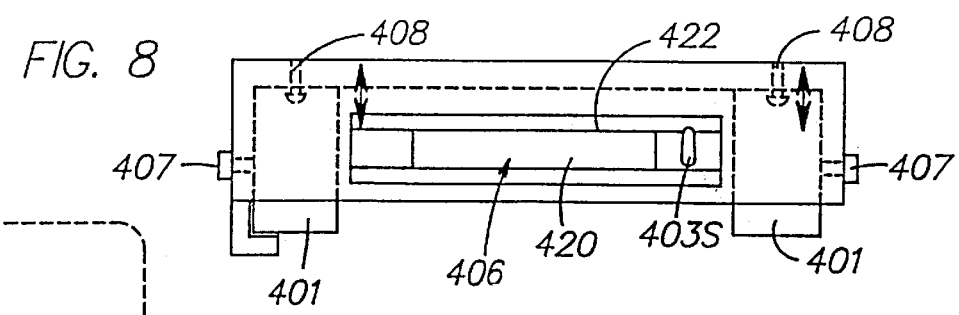
FIG. 8 is a partial left elevational view of the cross-cut table assembly of FIG. 5.

A set of screws 408 may be provided on the top of the auxiliary rails 401. The subpanel 405 rests on the screws 408. Accordingly, a user may change the height or level of the subpanel 405 by changing the height of the screws 408. Also, because the table 402 rests on top of subpanel 405, a user may ultimately change the height or level of the table 402 by changing the height of the screws 408. While FIGS. 6 and 8 show the subpanel 405 contacting the end of the screws 408, a person skilled in the art recognize that the screws 408 can be inverted so that the head of the screws contact the subpanel 405 and achieve the same result.

The subpanel 405 may also have a lower hook portion 405H which engages the auxiliary rails 401, to maintain the subpanel 405 in contact with the rails 401 during shipping.

Figure 39:
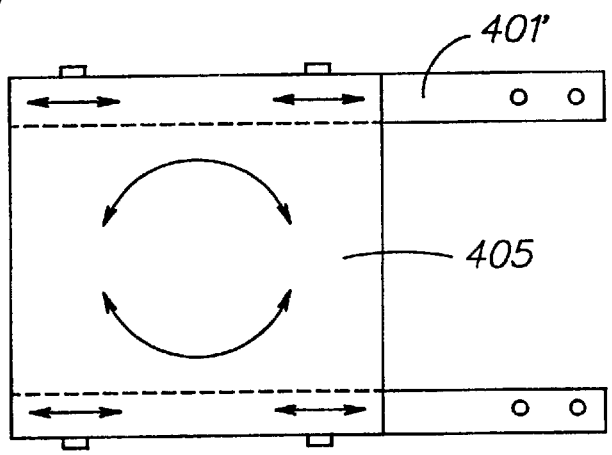
FIG. 39 is a partial top plan view of the cross-cut table assembly of FIG. 38.

A user may also desire to adjust the horizontal position of table 402 relative to table 103 and/or the direction in which the table 402 slides along. This may be achieved by providing slots 410s on the auxiliary rails 401, through which screws 410 are threadedly attached to the table 103. With such arrangement, the auxiliary rails 401 can be individually moved along their longitudinal axis. Accordingly, a user can ultimately move the table 402 sideways by moving both auxiliary rails 401. The user can also adjust the direction in which the table 402 slides along by moving one auxiliary rail in one direction and/or the other auxiliary rail in the other direction, thus rotating the loosely fit subpanel as best seen in FIG. 39. Thus, the user can easily maintain or adjust the sliding direction of table 402 to be parallel to the blade 104.

Preferably, slid-assemblies 406 are provided between and fixedly attached to both the subpanel 405 and the table 402. The slide assembly 406 may be similar to the ball bearing slide assembly described in U.S. Pat. Nos. 4,200,342 and 4,370,007, and their teachings are incorporated by reference herein. It is preferable that the slide assembly 406 be a two-way slide. As shown in FIG. 6, the slide assembly 406 has two main elements 420 and 421, which are fixedly attached to table 402 and subpanel 405, respectively. A ball bearing carriage 422 is disposed between the two main elements 420 and 421.

A cleaning pad, preferably made of felt, may be disposed at or near the ends of the bearing carriage 442 in order to clean the channel between the two main elements 420 and 421, reducing the effect of dust in the slide assembly 406 and in the bearing carriage 422. Such cleaning pad is disclosed in U.S. Pat. Nos. 1,223,112 and 2,994,567 and German Utility Model No. 93 07 670, which are incorporated by reference herein.

It is also preferable to provide brushes 423 on the sliding table 402. The brushes 423 can then brush off any dust collected on the subpanel 405 and/or the slide assemblies 406.

Figure 5:
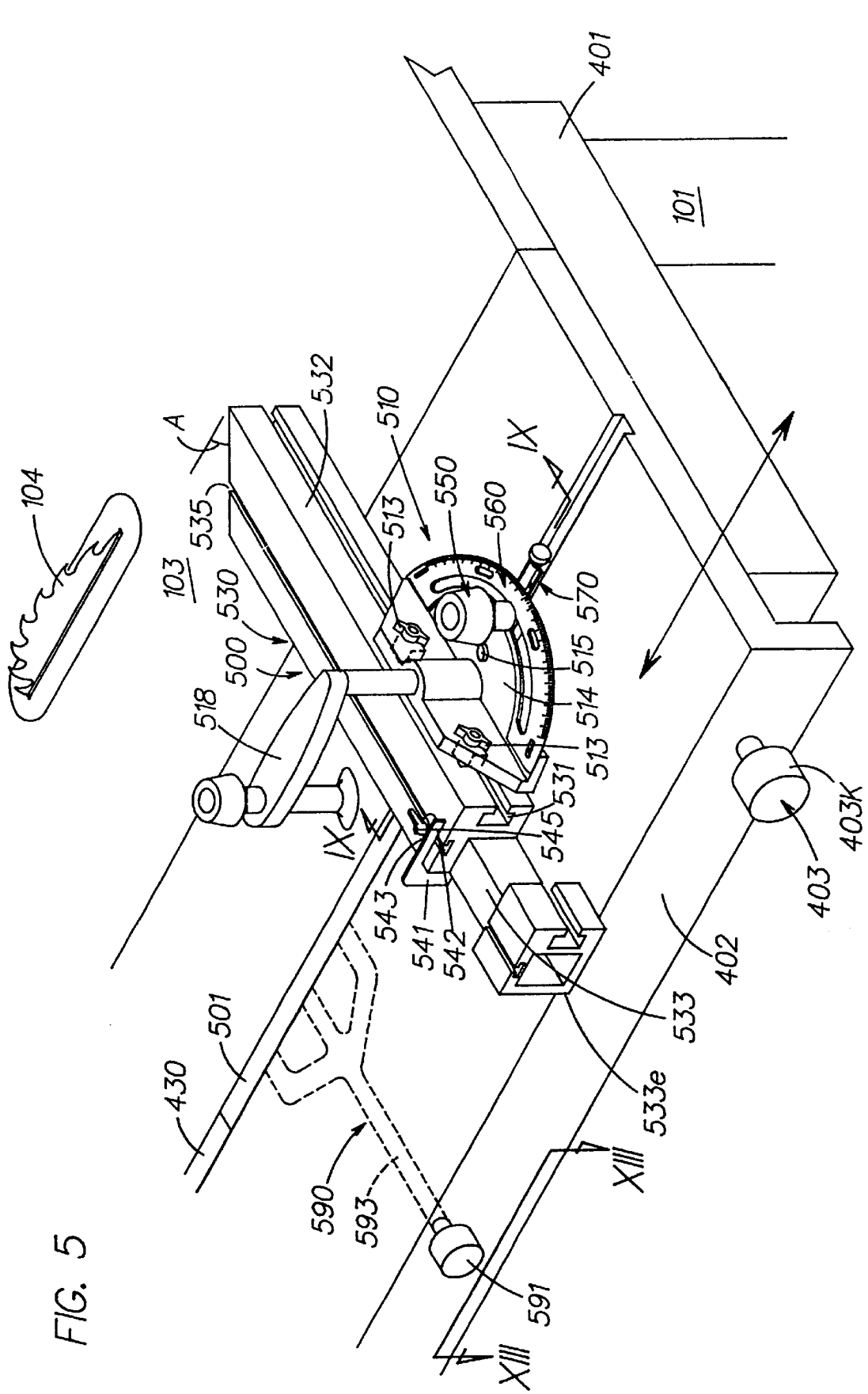
FIG. 5 is a partial front perspective view of a cross-cut table assembly and a miter gauge assembly of the table saw of FIG. 1.

A cross-cut table lock assembly 403 may also be provided on table 402. Basically, as shown in FIGS. 1, 5 and 8, the lock assembly 403 includes a knob 403k, and a pin 403p connected to the knob 403k and extending through the table 402. This pin 403p may engage slot 403s in slide assembly 406 and/or subpanel 405, preventing any further movement of the sliding table 402.

Figure 42:
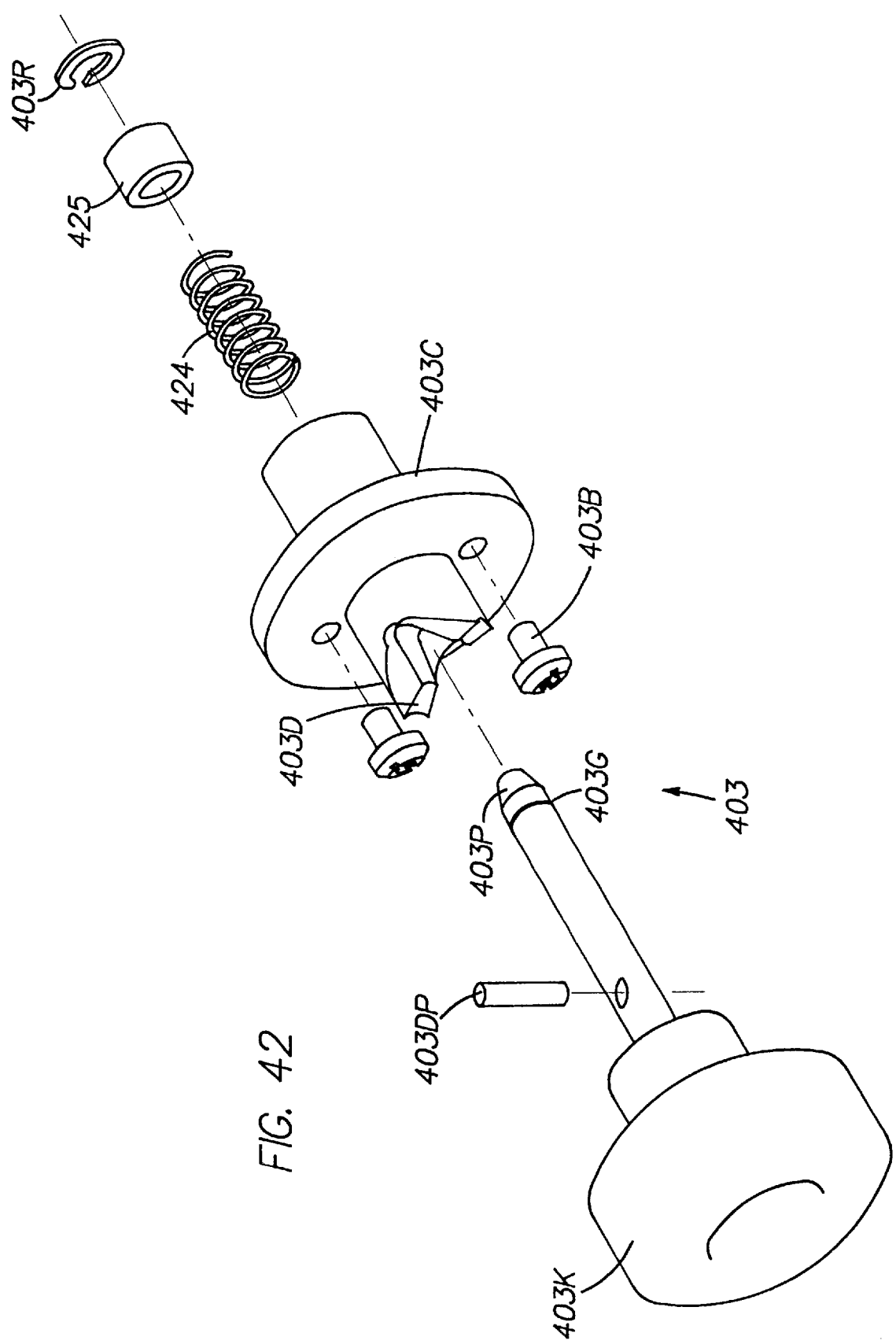
FIG. 42 is an exploded view of the cross-cut table lock assembly.
Figure 43:
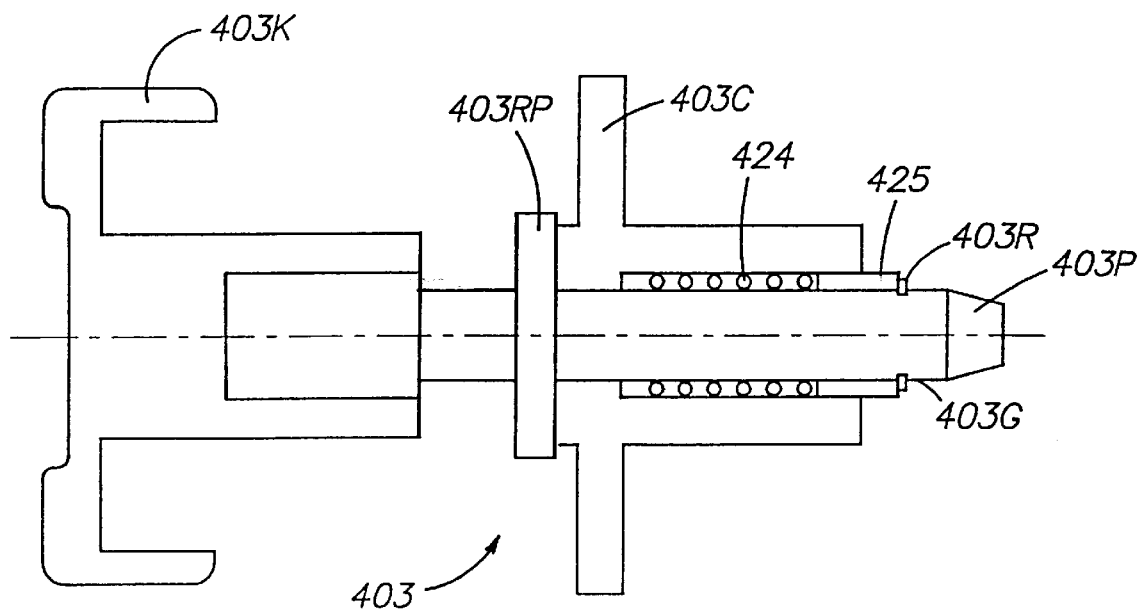
FIG. 43 is a cross-sectional view of the cross-cut table lock assembly of FIG. 42.
Figure 44:
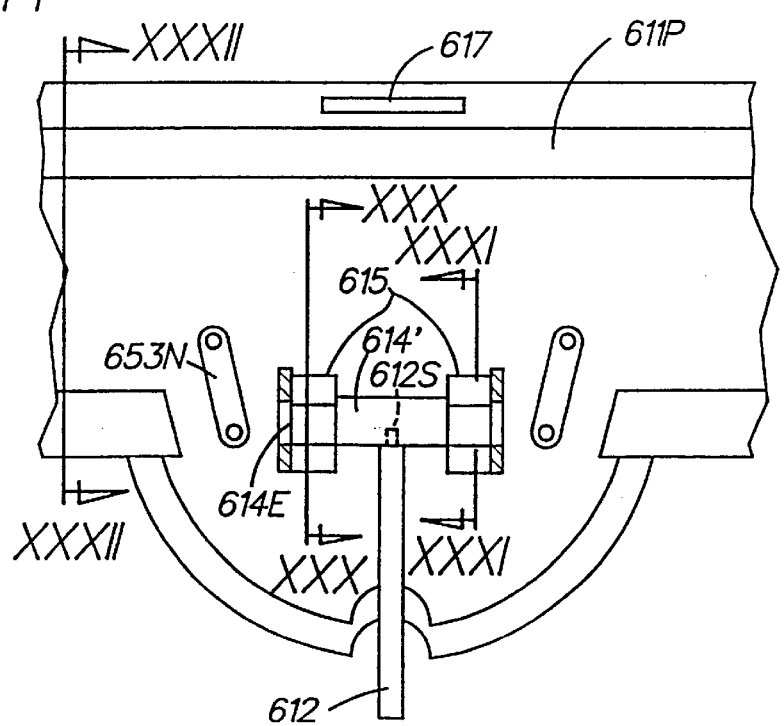
FIG. 44 is a bottom plan view of a third embodiment of the fence head assembly.

Referring to FIGS. 42 and 43, a channel assembly 403C is attached to the sliding table 402 via screws 403B. The assembly 403C has a channel for slidably receiving the pin 403p. The channel also receives a spring 424 disposed around the pin 403p. The spring 424 is held in place by a sleeve 425 disposed around the pin 403, which in turn is held by a retainer clip 403R. The retainer clip 403R is disposed on a groove 403G on the pin 403p. This arrangement is provided so that the pin 403p is normally biased towards the extended, locked position.

On the knob end of pin 403p, a detent pin 403DP extends therethrough. The detent pin 403DP engages detent notches 403D disposed on the channel assembly 403C. Accordingly, the user can turn the knob 403k about 90° to retract the pin 403p and maintain it in the unlocked position. If the user wants to return the pin 403p towards the extended position, the user need only turn the knob 403k again.

Figure 38:
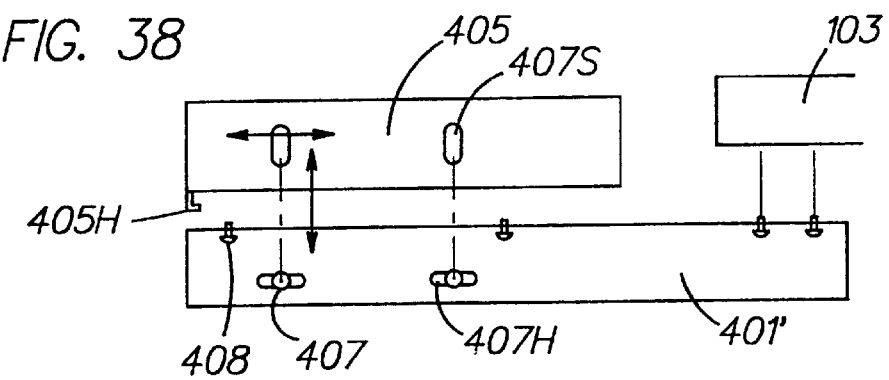
FIG. 38 is a partial front view of a second embodiment of the crosscut table assembly.

Referring to FIGS. 38 and 39, a second embodiment of the cross-cut assembly is illustrated. The only differences between the two embodiments are as follow: First, the auxiliary rails 401' do not have slots 410s, like in the first embodiment. Instead, screws 407 slide along horizontal slots 407H provided on the auxiliary rails 401'. Accordingly, the subpanel 405 can be adjusted horizontally relative to the table 103 and vertically relative to the auxiliary rails 401'. As shown in FIG. 39, the user can still ultimately move the table 402 sideways by moving the subpanel 405 relative to the table 103. Similarly, the user can still adjust the direction in which the table 402 slides along by moving the subpanel 405 along one auxiliary rail in one direction and/or along the other auxiliary rail in the other direction. Thus, the user can easily maintain or adjust the sliding direction of table 402 to be parallel to the blade 104.

Figure 41:
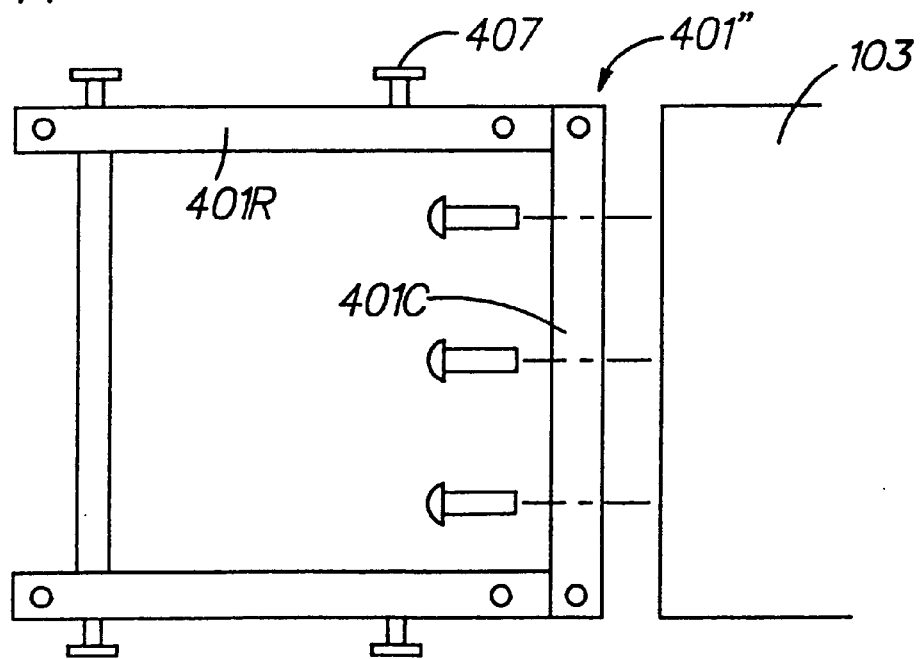
FIG. 41 is a partial top plan view of the cross-cut table assembly of FIG. 40.
Figure 40:
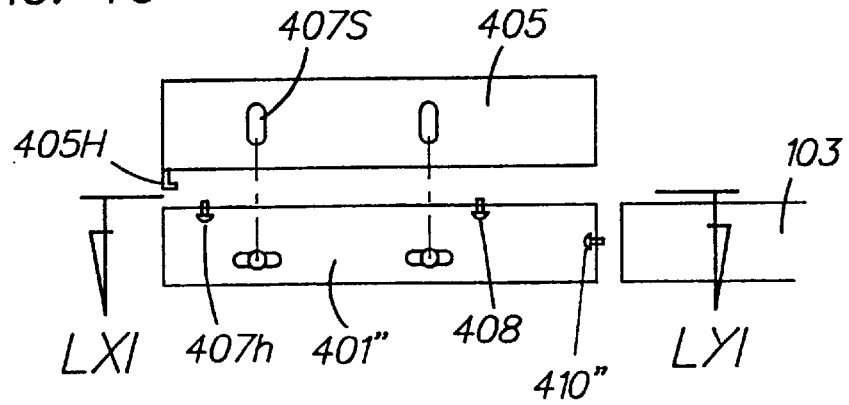
FIG. 40 is a partial front view of a third embodiment of the cross-cut table assembly.

The different embodiments of the cross-cut table assembly 400 described above can be easily adapted into a universal cross-cut table assembly that can be attached to most table saws, regardless of brand or model. FIGS. 40 and 41 illustrate such universal cross-cut table assembly based on the second embodiment of the cross-cut table assembly. The main difference between the second embodiment and the universal assembly is the auxiliary rails. In the present embodiment, the auxiliary rails 401" include two side rails 401R and a center beam 401C joining the two side rails 401R. Such arrangement allows the auxiliary rails 401" to be attached to or bolted onto the side of table 103, instead of underneath the table 103.

Miter Gauge Assembly 500

A miter gauge assembly 500 is also provided. Referring to FIGS. 5 and 9–13, table 402 has a miter groove 430, preferably parallel to the blade 104. (Persons skilled in the art will recognize that such miter groove 430 may also be disposed on table 103 or sliding table 300.) The miter gauge assembly 500 has a guide bar 501 disposed on the groove 430, a miter head assembly 510 rotatably attached to the guide bar 501, and a fence assembly 530 slidably attached to the miter head assembly 510.

Figure 9:
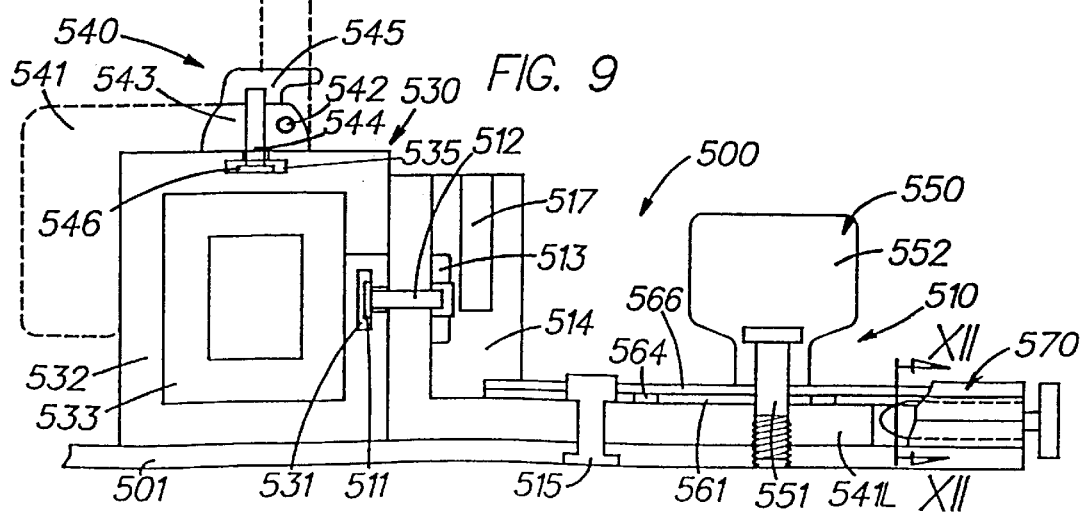
FIG. 9 is a partial cross-sectional view of the miter gauge assembly of FIG. 5 along line IX—IX.

As shown in FIGS. 5 and 9, the fence assembly 530 may have a channel 531 provided within to hold a T-nut or sliding strip 511. The nut or strip 511 threadingly engages a bolt 512, which is preferable insert-molded in knob 513, for securing the fence assembly 530 in place against the miter head assembly 510. Accordingly, a user may slide the fence assembly 530 relative to the miter head assembly 510 and lock the fence assembly 530 in place by twisting the knob 513. Persons skilled in the art will recognize that a cam lock or overcenter mechanism, such as the one described below, may be used instead to secure the fence assembly 530 in place. In addition, persons skilled in the art will recognize that the strip 511 may be long enough to receive all bolts 512.

The fence assembly 530 may also have an outer rail 532. The outer rail 532 may be constructed of extruded aluminum and may have a rectangular top plan. However, it is preferable to cut off or machine the end of the outer rail 532 closest to the blade so that the end is at an angle A relative to the original end (see FIGS. 5 and 13A). In this manner, when conducting a mitering operation, the outer rail 532 may be closely disposed to the blade 104, while providing support to the workpiece.

The fence assembly 530 may also have an inner rail 533 telescoping within the outer rail 532. The inner rail 533 may have at its non-telescoping distal end 533e the same cross-section as the outer rail 532 in order to maintain the same overall fence profile.

The fence assembly 530 may also have a flip-down stop assembly 540, which can be pivoted downwards to stop a workpiece (not shown). The stop assembly 540 may have a flip stop 541 which may be pivoted about a pin 542 between two positions: a first raised position, where the flip stop 541 is above the fence assembly 530 and not contacting a workpiece, and a second lowered position, where part of the flip stop 541 is below the top surface of fence assembly 530 and contacting a workpiece.

Stop assembly 540 may also have a main housing 543, a bolt 544 extending therethrough and insert-molded in a knob 545, and a T-nut or sliding strip 546 threadingly engaging the bolt 544. The nut or strip 546 is slidingly received in channel 535 (in fence assembly 530), so that the entire stop assembly 540 may be slid throughout the length of the channel 535. Accordingly, a user may slide the stop assembly 540 relative to the fence assembly 530 and lock the stop assembly 540 in place by twisting the knob 545. Persons skilled in the art will recognize that a cam lock or overcenter mechanism may be used instead to secure the stop assembly 540 in place.

Figure 10:
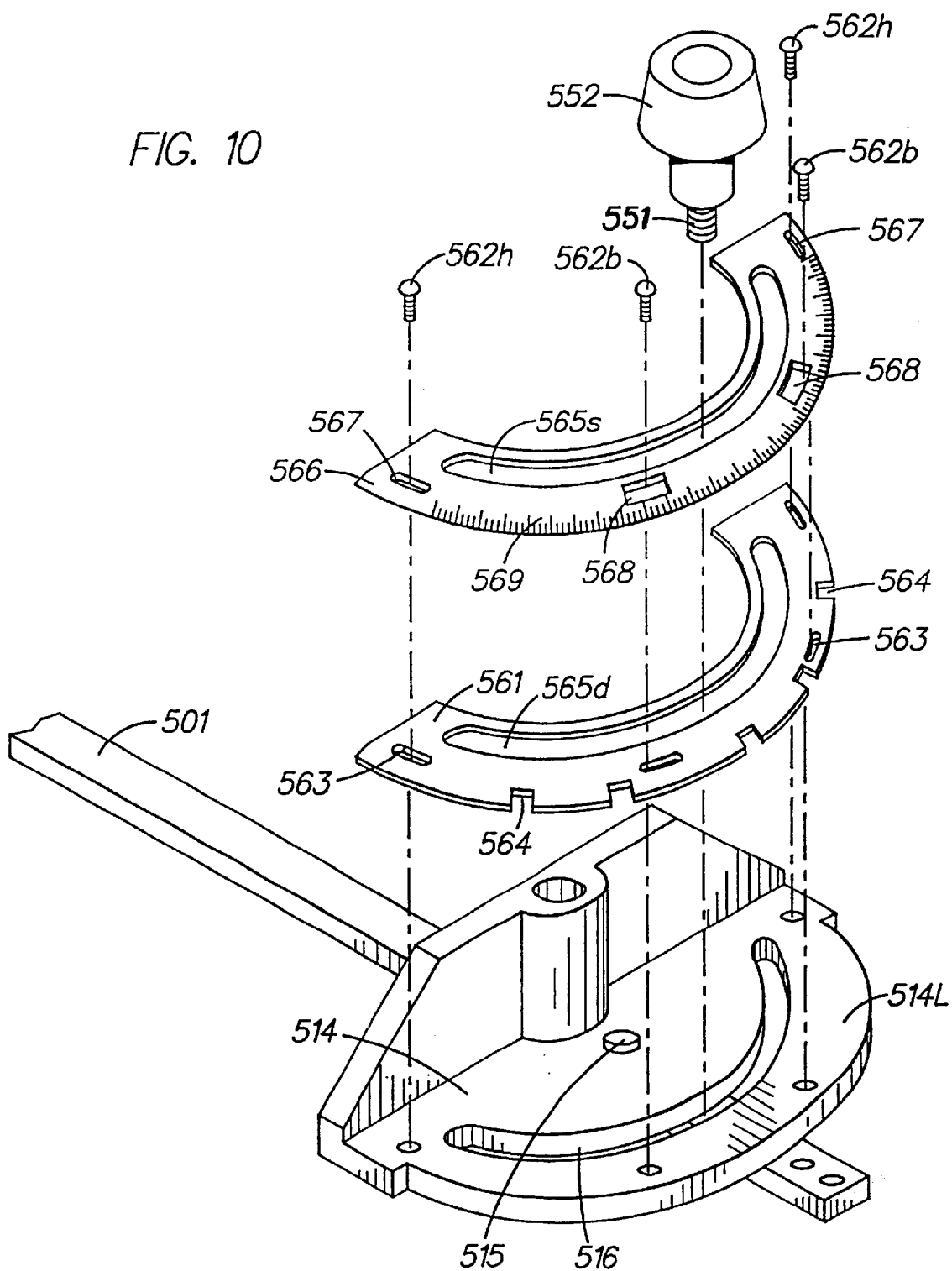
FIG. 10 is a partial exploded view of the miter gauge assembly of FIG. 5.

As mentioned above, the miter head assembly 510 is rotatably attached to the guide bar 501. Referring to FIGS. 5 and 9–10, the miter head assembly 510 may have a main body 514 rotatably disposed above and rotatably attached to the guide bar 501 by a bolt 515, a miter head lock assembly 550 for locking the main body 514 in the desired rotational position, a miter detent/scale mechanism 560 and a latch assembly 570.

The miter head lock assembly 550 may comprise a knob 552, and a bolt 551, preferably insert-molded in knob 552, threadingly engaging the guide bar 501. A seen in FIG. 10, the main body 514 has a slot 516 that allows rotational movement of the main body 514 relative to the guide bar 501 without interference from bolt 551. Accordingly, a user may pivot the main body 514 relative to guide bar 501 about bolt 515. The user may then lock the main body 514 in place by twisting the knob 552. Persons skilled in the art will recognize that a cam lock or overcenter mechanism may be used instead to secure the main body 514 in place.

Another aspect of the invention is the novel detent mechanism that is comprised by the miter detent/scale mechanism 560 disposed on the main body 514 and the latch assembly 570 disposed on the guide bar 501. The advantage of this detent mechanism will be explained below.

Referring to FIGS. 5 and 9–10, the miter detent/scale mechanism 560 may include a semi-circular miter detent plate 561, preferably made of steel or stainless steel, slidingly disposed on the main body 514. The detent plate 561 is held on the main body 514 by a set of screws 562h and 562b. A set of corresponding slots 563 is provided on the detent plate 561 so that a user can slide the detent plate 561 relative to the main body 514 along the slots 563. The detent plate 561 also has notches 564 disposed at the outer edge of the detent plate 561. These notches 564 are disposed at select locations of the detent plate 561. A semi-circular slot 565d is also provided in order to allow rotational movement of the main body 514 relative to the guide bar 501. Persons skilled in the art will note that the detent plate 561 preferably extends beyond the lip 514L of main body 514.

A semi-circular scale plate 566, preferably made of steel or stainless steel, is slidingly disposed on the detent plate 561. As seen in FIG. 10, a scale 569 may be provided on the scale plate 566 to indicate, indicate, in conjunction with pointer 558 (see below), the rotational position of the main body 514 relative to the guide bar 501. In addition, a semi-circular slot 565s is provided in order to allow rotational movement of the main body 514 relative to the guide bar 501. In addition, the scale plate 566 may be held in place by the screws 562h. The scale plate 566 may have a set of slots 567, which correspond to screws 562h. These slots 567 allow the user to slide the scale plate 566 relative to main body 514 and/or the detent plate 561.

The scale plate 566 may also have a second set of oversized slots 568, which completely bypass the screws 562b. Accordingly, the screws 562b do not contact or hold the scale plate 566. These slots 568 allow the user to adjust the scale plate 566 relative to main body 514 and/or the detent plate 561 without adjusting the detent plate 561.

Referring to FIGS. 5, 9 and 11–12, the latch assembly 570 is fixedly attached to guide bar 501 via screws 571, through holes 571H. Holes 571H may be oversized holes or slots, allowing rotational or sideways movement of the latch assembly 570. The latch assembly 570 may have a lower body 572, and a upper body 573 fixedly attached to the lower body 572 via screws 574. The upper body 573 has a pointer 558 disposed thereon that, in conjunction with scale plate 566, indicate the rotational position of the main body 514 relative to the guide bar 501.

As shown in FIGS. 11 and 12, the lower body 572 and upper body 573 create a central channel 575 which slidingly receives a pin 576. The pin 576 is connected to a knob 578, so that a user can slide the pin 576 in and out of channel 575. The channel 575 may have a cylindrical profile 575c at the rear end of the channel 575, i.e., towards the knob 578. The channel 575 may also have a front V-shaped lower profile 575v at the front end of the channel 575. The channel 575 may have a semi-cylindrical profile or flat profile above the V-shaped lower profile 575v. Preferably the portion 575v is upwardly slanted at the end closest to the detent plate 561, as shown in FIG. 12B. This slant forces the pin 576 towards notch 564, as explained below.

In addition, a spring 579 may be connected between the pin 576 and a holder 559, normally biasing the pin 576 towards a extended position, i.e., extending beyond the front of the latch assembly 570. The holder 559 is preferably disposed on a groove 559G on the pin 576.

A detent 577M may also be provided on the pin 576. The detent 577M engages a long detent notch 577FL or a short detent notch 577FS. If the detent 577M engages the long detent notch 577FL, the pin 576 can slide in and out of channel 575 and is normally biased towards the extended position. If a user pulls out and rotates the pin 576 preferably about 90° so that the detent 577M engages the short detent notch 577FS, the pin 576 is held in a retracted position until the user rotates the pin 576 in the opposite direction and reengages the detent 577M with the long detent notch 577FL.

As shown in FIGS. 9 and 12, the pin 576 may engage a notch 564 of detent plate 561. It is thus beneficial to place, or "program", the notches 564 on the detent plate 561 to correspond with commonly desired miter angles, i.e., the angles between the main body 514 and the guide bar 501. Such commonly desired angles include 0°, 22.5°, 45°, −22.5°, −45°, etc., where 0° is when the fence assembly 530 connected to the main body 514 is substantially perpendicular to the guide bar 501. Accordingly, if the user wants to quickly and accurately find the 0° angle, the user need only to pull out the pin 576, move the main body 514 towards the 0° angle as indicated by scale 569 in conjunction with pointer 558, and to let go of the pin 576. Because the pin 576 is normally biased towards the extended position, the user can continue moving the main body 514 towards the 0° angle until the pin 576 engages the corresponding 0° angle notch 564.

Contrary to some prior art miter gauge detent mechanism, the mechanism described above minimizes the "play" in the pin, providing a more accurate angle setting. This is achieved by limiting the number of lines of contact, or "contact lines", between the detent plate 561 and pin 576 and between the lower body 572 and pin 576. The total number of contact lines between detent plate 561, lower body 572 and pin 576 is less than infinity and is preferably between 3 and 10. Because of the limited number of contact lines, a "tighter" contact with less play can be obtained. As shown in FIG. 12, the pin 576 is contacted in 4 different lines by the detent plate 561 and the channel 575v. This limits the range of movement, or "play", that the pin 576 may otherwise have.

The main body 514 may also have a channel 517 for receiving a clamp 518 as is known in the art. Also, persons skilled in the art will recognize that bolt 515 may be placed underneath channel 517.

Miter Gauge Assembly 700

Figure 46:
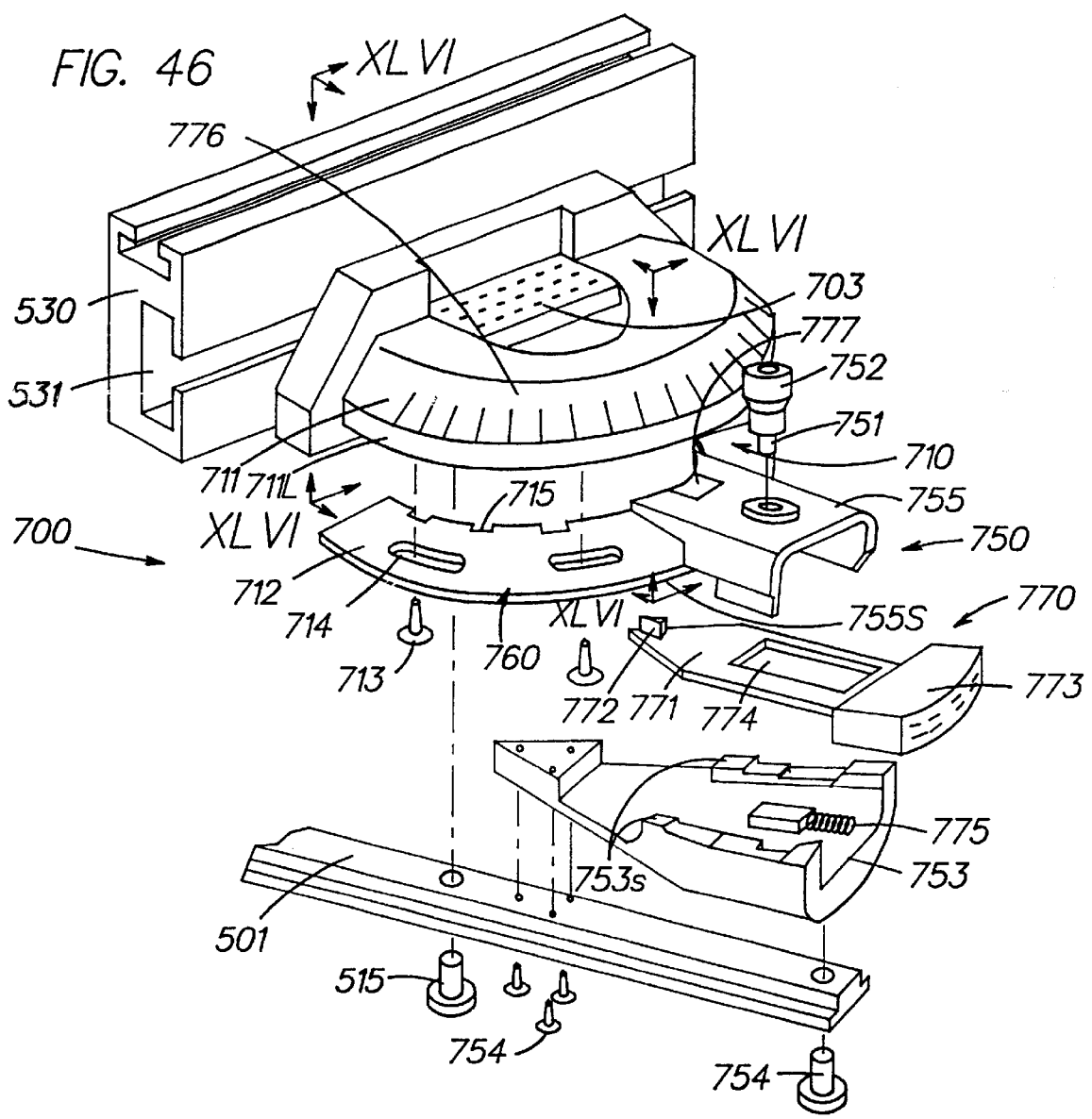
FIG. 46 is an exploded view of an alternate embodiment of the miter gauge assembly.
Figure 47:
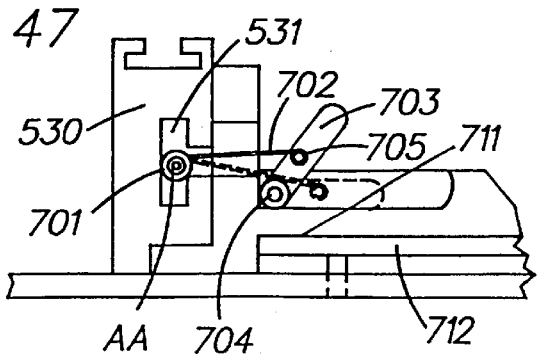
FIG. 47 is a partial cross-sectional view of the miter gauge assembly of FIG. 46 along plane XLVII—XLVII—XLVII—XLVII.

An alternate embodiment of miter gauge assembly 500 is shown in FIGS. 46–47 as miter gauge assembly 700, where like numerals refer to like parts. Miter gauge assembly 700 has a guide bar 501, a miter head assembly 710 rotatably attached to the guide bar 501, and a fence assembly 530 slidably attached to the miter head assembly 510.

As shown in FIGS. 46–47, the fence assembly 530 may have a channel 531 provided within to hold a rod 701. The rod 701 may be connected to a link 702, preferably at one end of link 702 at point AA. Link 702 may be made of steel. Link 702 may be connected at its other end to actuator 703. Preferably link 702 is pivotally attached to actuator 703 via pin 705. Actuator 703 may be pivotally attached to head body 711 (which is part of miter head assembly 710) via pin 704. Preferably, pin 704 is between point AA and pin 705 when actuator 703 is moved towards a locking position.

Persons skilled in the art will recognize that such construction creates an overcenter mechanism. Accordingly, to lock fence assembly 530 in place, the user need only pivot actuator 703 towards the head body 711. Link 702 will then move with actuator 703, pulling on rod 701 and locking fence assembly 530 in place. To unlock the fence assembly 530, the user need only to pivot actuator 703 away from head body 711.

As mentioned above, the miter head assembly 710 is rotatable attached to the guide bar 501. Referring to FIGS. 46–47, the miter head assembly 710 may have a head body 711 ratably disposed above and pivotally attached to guide bar 501 by a bolt 515. Miter head assembly 710 may also interact with a miter head lock assembly 750 for locking the head body 711 in the desired rotational position, a miter detent mechanism 760 and a latch assembly 770.

The miter head lock assembly 750 may comprise a knob 752, and a bolt 751, preferably inner-molded in knob 752, threading engaging the guide bar 501. Alternatively, bolt 751 may threadingly engage lower clamp body 753, which is in turn disposed above and fixedly attached to guide bar 501, preferably via bolts 754.

An upper clamp body 755 is preferably disposed between knob 752 and lower clamp body 753. Both upper and lower clamp bodies have clamping surfaces 755S and 753S, respectively, that pinch or clamp part of the head body 711. In particular, clamping surfaces 753S and 755S pinch a miter detent plate 712 which is attached to head body 711. With such construction, the user need only rotate knob 752, which forces upper clamp body 755 towards lower clamp body 753. As the clamp bodies get closer together, the clamping surfaces get closer together also, clamping on either head body 711 and/or plate 712, locking head body 711 in the appropriate rotational position.

The miter detent mechanism 760 may include a semi-circular, or arcuate, miter detent plate 712, preferably made of steel or stainless steel, slidingly disposed on the head body 711. The plate 712 is held on the head body 711 by a set of screws 713. A set of corresponding slots 714 is provided on the detent plate 712 so that a user can slide the detent plate 712 relative to the head body 711 along the slots 714.

The plate 712 may also have notches 715 disposed at the inner edge of the detent plate 712. These notches 715 are disposed at select locations of the detent plate 712. Persons skilled in the art will note that the detent plate 712 preferably extends beyond the lip 711L of head body 711, in order to allow upper and lower clamp bodies 755, 753 to clamp the plate 712 therebetween.

Preferably, the latch assembly 770 is disposed between the upper and lower clamp bodies 755, 753. The latch assembly 770 may include a latch body 771. Latch body 771 in turn may include a detent projection 772 and a button 773. Preferably the detent projection, or pin, 772 and the button 773 are arranged at opposite ends of latch body 771.

Latch assembly 770 may also include a spring 775, normally biasing latch body 771 away from head body 711. In other words, spring 775 normally biases latch body 771 towards a position where pin 772 engages notch 715. Accordingly, it is beneficial to place, or program, the notches 715 on the plate 712 to correspond with commonly desired miter angles, i.e., angles between the head body 711 and the guide bar 501.

With such construction, if the user wants to quickly and accurate find the 0° angle, the user need only to push the button 773, move the head body 711 towards the 0° angle as indicated by scale 776 in conjunction with pointer 777, and to let go of the button 773. The spring 775 will then push pin 772 into engagement with the 0° notch. This arrangement is advantageous over the typical prior art as it is more ergonomic and easier to use, since the user pushes a button, instead of pulling a pin.

Latch body 771 may also have a hole 774 to allow bolt 751 to extend therethrough. Persons skilled in the art will recognize that the hole should be dimensioned so that the latch body 771 can move through a variety of positions without contacting bolt 751.

Miter Gauge Assembly 900

Figure 48:
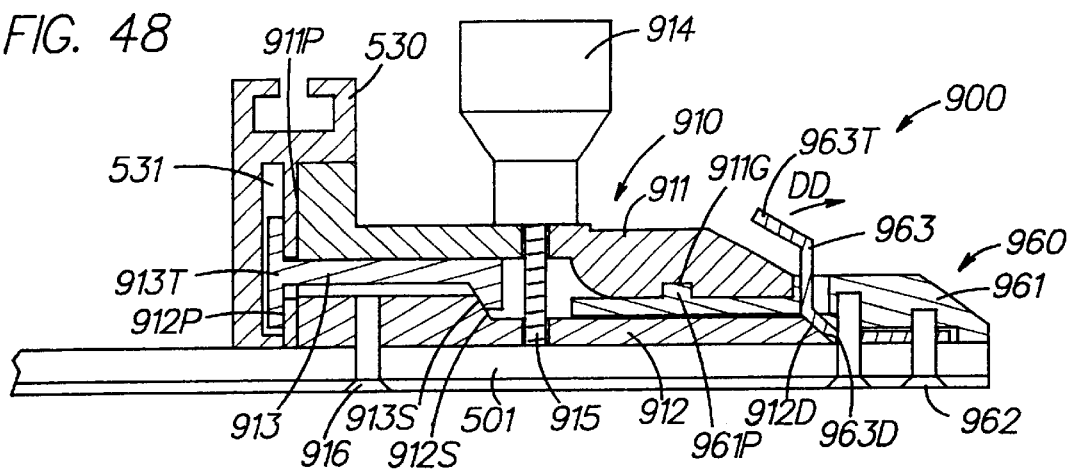
FIG. 48 is a cross-sectional view of a second alternate embodiment of the miter gauge assembly.
Figure 51:
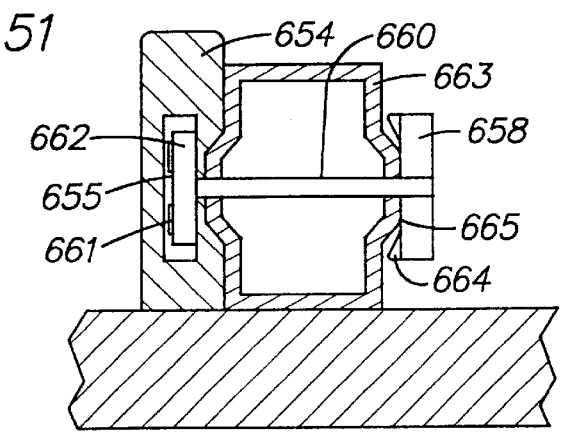
FIG. 51 is a partial cross-sectional view of an alternate fence beam assembly along line X—X in FIG. 15.

Another alternate embodiment for miter gauge assembly 500 is illustrated as miter gauge assembly 900 in FIG. 48, where like numerals refer to like parts. The miter gauge assembly 900 may have a guide bar 501, a miter head assembly 910, and a fence assembly 530 slidably attached to the miter head assembly 910.

Miter head assembly 910 may include a lower body 912 disposed above and pivotally attached to guide bar 510 via bolt 916. An upper body 911 is disposed above lower body 912. A knob 914 is disposed on upper body 911. A bolt 915, preferably insert-molded in knob 914, may threadingly engage guide bar 501. Accordingly, the user can lock the miter head assembly 911 by rotating knob 914, which clamps lower and upper bodies 912, 911 between knob 914 and guide bar 501. Persons skilled in the art will recognize that an arcuate slot should be provided in both lower and upper bodies 912, 911 so that they can be pivoted relative to bolt 916 without interference from bolt 915.

Preferably, both lower and upper bodies 912, 911 have co-planer surfaces 912P, 911P, respectively. Fence assembly 530 can then be disposed against surfaces 912P, 911P. Because of the contact between fence assembly 530 and lower and upper bodies 912, 911, as the user moves fence assembly 530, both lower and upper bodies 912, 911 will rotate together accordingly.

The fence assembly 530 may have a channel 531 provided within to receive a T-shaped portion 913T of actuator 913. Actuator 913 is disposed between upper body 911 and lower body 912. Actuator 913 preferably has an inclined surface 913S which contacts a similar inclined surface disposed on the upper body 911 and/or lower body 912. As shown in FIG. 48, lower body 912 has an inclined surface 912S.

With such construction, when the user rotates knob 914, as the upper body 911 moves closer to lower body 912, actuator 913 slides along inclined surface 912S away from fence assembly 530. Because T-portion 913T moves along with actuator 913, it locks or clamps fence assembly 530 in place. Persons skilled in the art should recognize that this arrangement is advantageous as a user can lock both the rotational position of miter head assembly 910 and/or fence assembly 530 relative to guide bar 501, and lock the fence assembly 530 relative to miter head assembly 910 at the same time.

Miter gauge assembly 900 may also include a miter detent mechanism 960. Miter detent mechanism 960 may include a latch body 961 is disposed above and fixedly attached to guide bar 501 via bolts 962. A spring 963 is disposed between latch body 961 and guide bar 501. Spring 963 is preferably made of a flexible, resilient metal, such as steel. Spring 963 has an engaging portion 963D to engage a notch or hole disposed on upper body 911 and/or lower body 912. In FIG. 48, portion 963D engages notches 912D disposed on lower body 912. Persons skilled in the art will recognize that notches 912D can be integrally formed within lower body 912 or in a separate detent plate as discussed above.

Persons skilled in the art should also recognize that spring 963 should be designed so that portion 963D is normally biased towards notches 912D. Also as discussed above, it is beneficial to place, or program, the notches 912D to correspond with commonly desired miter angles, i.e., angles between the miter head assembly 910 and the guide bar 501. With such construction, if the user wants to quickly and accurate find the 0° angle, the user need only to disengage portion 963D, move the miter head assembly 910 towards the 0° angle, and to let go of the spring 963. The spring 963 will then push portion 963D into engagement with the 0° notch. To further facilitate this operation, spring 963 may have a tab 963T to enable the user to disengage the portion 963D from the notches 912 by moving tab 963T along direction DD.

To further facilitate the rotation of upper body 911 and/or lower body 912, latch body 961 may have a projection 961P engaging an arcuate groove disposed in upper body 911 and/or lower body 912. In FIG. 48, projection 961P engages an arcuate groove 911G disposed in upper body 911. Persons skilled in the art should recognize that the same result can be achieved if the projection is disposed on upper body 911 and/or lower body 912, while the arcuate groove is provided on latch body 961.

Miter Gauge Lock Assembly 590

Figure 13A:
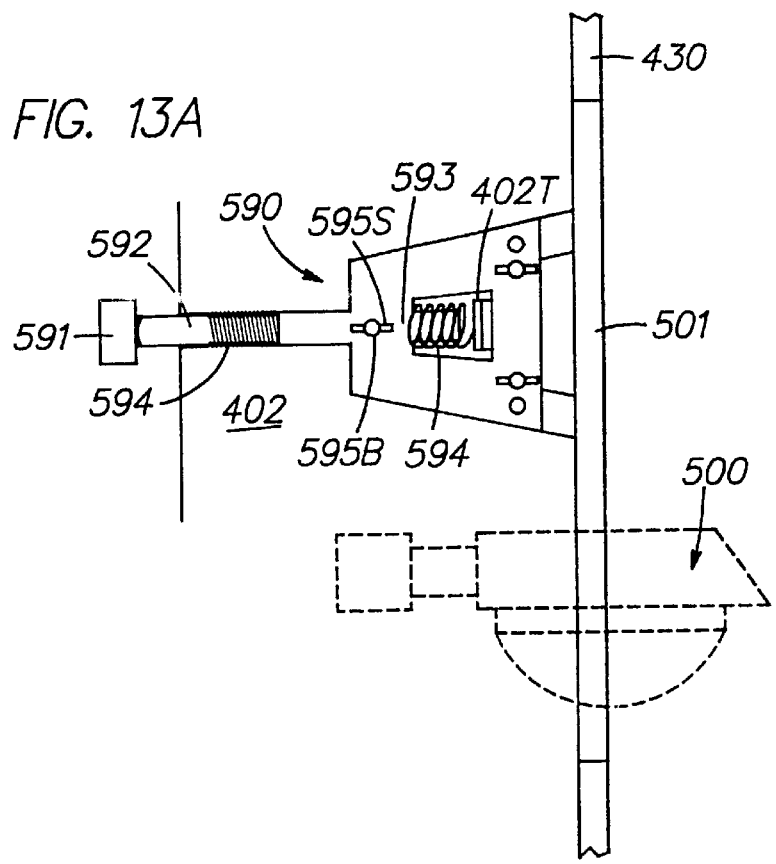
FIG. 13A is a partial cross-sectional view of a miter gauge lock assembly of FIG. 5 along line XIII—XIII.
Figure 13B:
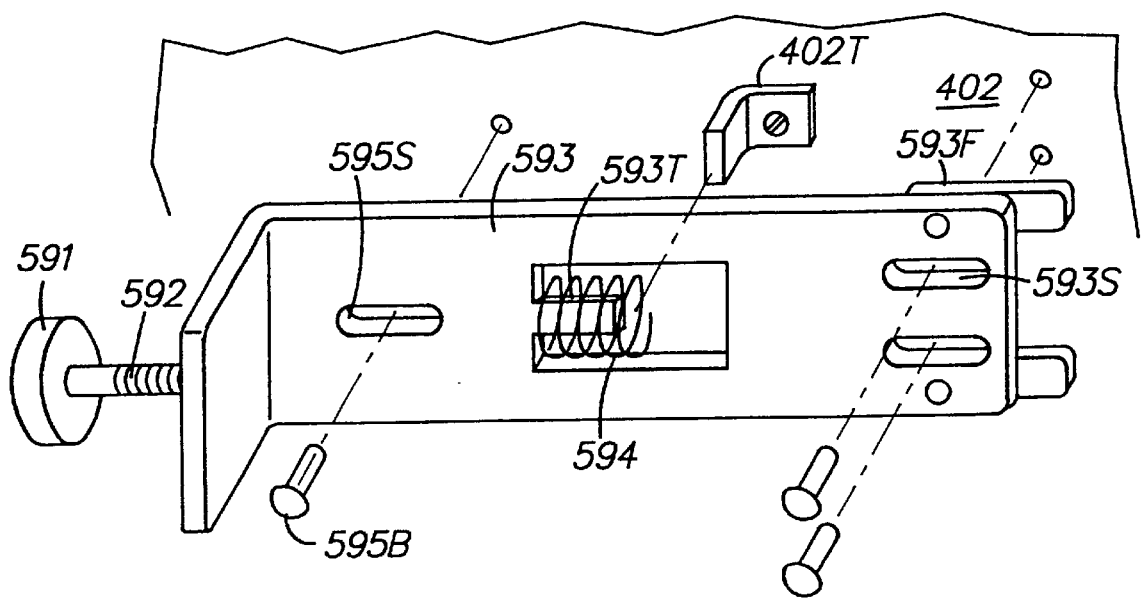
FIG. 13B is a perspective view of the miter gauge lock assembly.

Referring to FIGS. 5, 13A and 13B, the table saw may also have a miter gauge lock assembly 590, which is used to lock the position of the miter gauge assembly 500 along the groove 430, so that a user need only to move the crosscut table 402 in order to make rip cuts. The miter gauge lock assembly 590 may have a knob 591 connected to a screw 592. The screw 592 engages threads 594 disposed within table 402, converting the rotational movement of the knob 591 into linear movement along the longitudinal axis of screw 592. The screw 592 contacts lock plate 593.

Lock plate 593 may be slidingly attached to table 402 via screws 595B. Lock plate 593 has slots 595S allowing the plate 593 to slide relative to the screws 595B, and thus the plate 593. The lock plate 593 may have feet 593F, preferably made of powdered metal, attached to the lock plate 593 via screws 593S. The feet 593F extend into the groove 430.

The table 402 may have a downwardly extending tab 402T, which contacts a spring 594 disposed between the tab 402T and the lock plate 593. The lock plate 593 in turn may also have a tab 593T for holding the spring 594 in place. Preferably, the spring 594 is disposed so that it normally biases the lock plate 593 towards an unlocked position.

When the user rotates the knob 591, the screw 592 moves towards the groove 430. The screw 592 in turn moves the lock plate 593 and feet 593F against the guide bar 401 until the guide bar 501 is moved against the groove 430, locking the miter gauge assembly 500 in place. In order to unlock the miter gauge assembly 500, the user need only rotate the knob 591 in the reverse direction. The spring 594 then pushes the lock plate 593 and feet 593F away from the guide bar 401, until the guide bar 401 is released.

Fence Assembly 600

As shown in FIG. 1, the table saw may have a fence assembly 600 slidably disposed on the rail assembly 200. The new fence 600 has two main elements: the fence head assembly 610 and the fence beam assembly 650. The fence head assembly 610 is slidably connected to the rail assembly 200, and is connected to the fence beam assembly 650.

Fence Head Assembly 610

As shown in FIGS. 1 and 15–17, the fence head assembly 610 has a head body 611 that slides on the rail assembly 200. The head body 611 has a receiving portion 611R, which receives the rail assembly 200. The receiving portion 611R may be semicircular at least in the top rear portion and preferably semicircular in the whole top portion.

Persons skilled in the art will note that the receiving portion 611R is preferably semicircular as the received portion of rail assembly 200 is circular. However, other suitable arrangements can easily be provided for circular rails, including, for example, an inverted V shaped receiving portion. Of course, other suitable arrangements can easily be provided for other rail cross-sections.

The head body 611 may have an open bottom that enables easy removal of the fence assembly 600 from the rail assembly 200.

Figure 32:
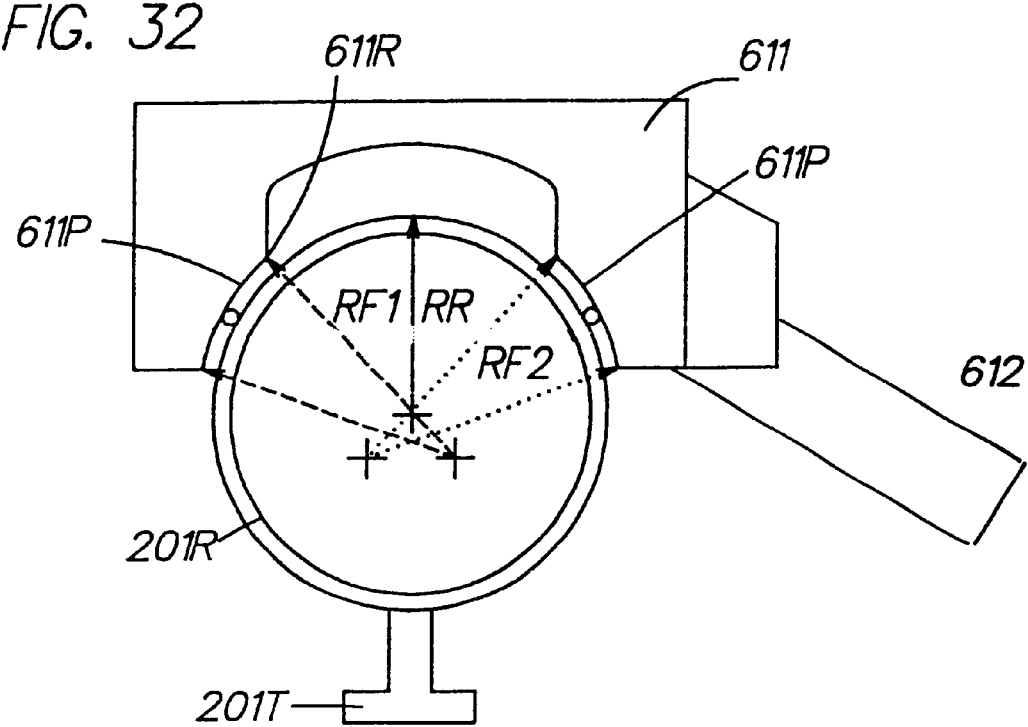
FIG. 32 is a partial cross-sectional view along line XXXII—XXXII of FIGS. 29 and 44.

Another preferable receiving portion 611R is shown in FIG. 32. The receiving portion 611R may include two pads 611P, which contact the rail 201R. The pads 611P are preferably curved. In addition, the curvature of the pads 611P are such that the respective radii RF1, RF2 of the pads 611P are larger than the radius RR of the rail 201. This guarantees that the pads 611P will contact the rail at only one point, minimizing friction. It also guarantees that the one contact point will be between the two ends of the pad 611P. However, if one end contacts the rail 201, the friction between the two may be so large that they will bind and/or be damaged.

Preferably, the pads 611P will be lubricated with a dry film solution. Such dry film does not absorb saw dust once it dries. Preferably the lubricant is mixed with a solvent, such as mineral spirits, and is disposed on the pads 611P. Such dry films include graphite, Teflon, molybdenum disulfide, etc. A preferred dry film is sold under the tradename DROP'L DO and may be obtained from LubeCon Systems, Inc., White Cloud Mich. 49349. Another preferred dry film is sold by Nye Lubricants, Inc., PO Box 8927 New Medford Mass. 02742-8927, as Experimental Dispersion SC980108A and contains isoparaffinic hydrocarbon.

Figure 54:
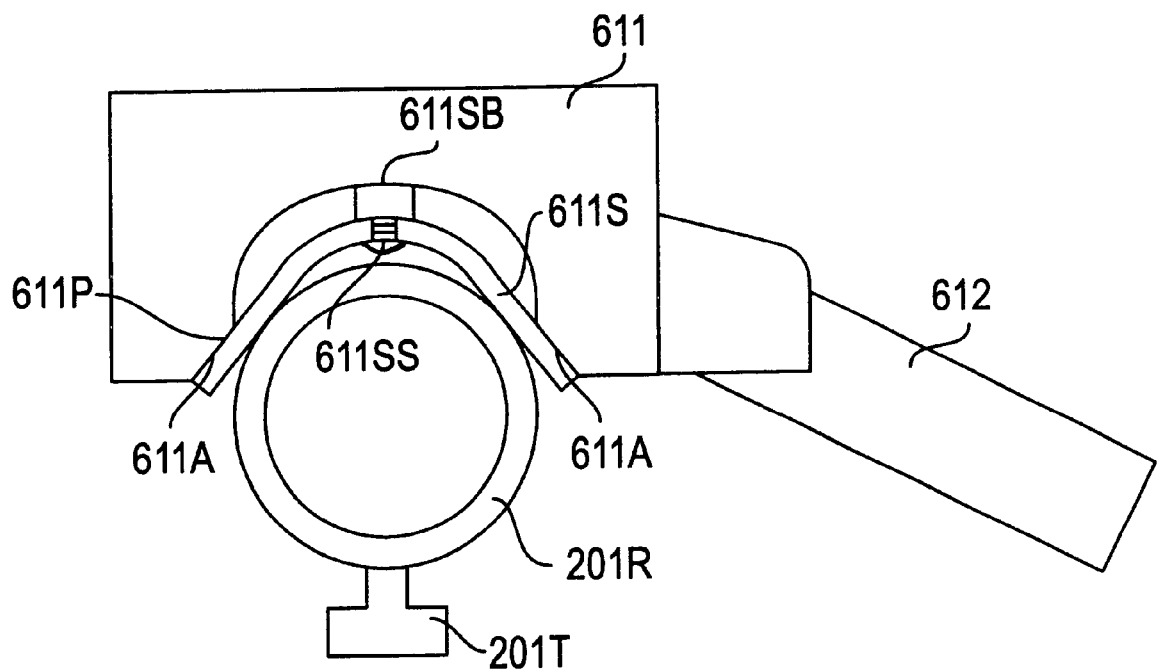
FIG. 54 is a side view of another embodiment of the fence head assembly.

Alternatively, a sheet 611S may be disposed between pads 611P and the rail assembly 200, as shown in FIG. 54, where like numerals refer to like parts. Sheet 611S may be made of plastic and is preferably adhered to pads 611P with an adhesive 611A. Head body 611 may also have bosses 611SB for receiving screws 611SS for holding sheet 611S therebetween. Preferably, sheet 611S is made of ultra-high molecular weight (UHMW) polyethylene, which is a plastic material resistant to abrasion. Persons skilled in the art will recognize that, because of sheet 611S, the ratio between the radii of pads 611P and rail 201 may be irrelevant.

Figure 33:
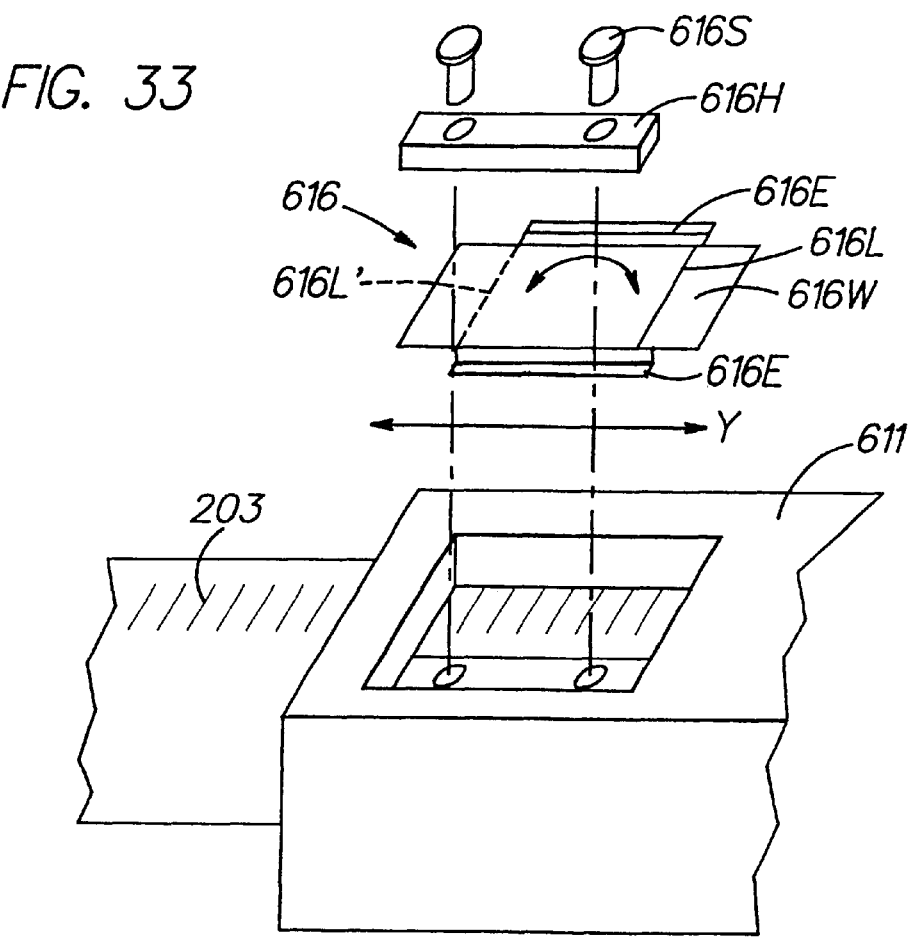
FIG. 33 is an exploded view of a window assembly.
Figure 34A:
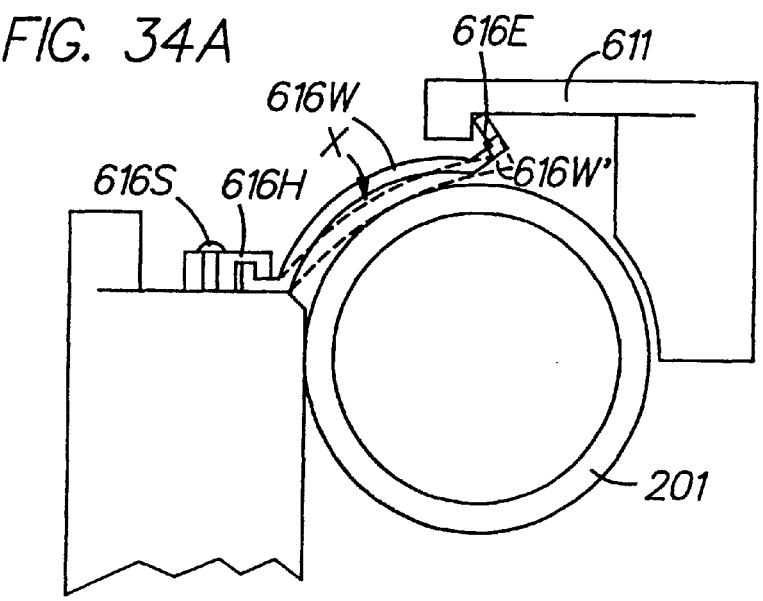
FIG. 34A is a cross-sectional view of the window assembly of FIG. 33.

Referring to FIGS. 15, 19, 33 and 34A, the head body 611 may also have a window assembly 616 that enables the user to see scale 203, disposed on rail assembly 200, indicating the distance between the fence assembly 600 and the blade 104. Referring to FIGS. 33 and 34A, the window assembly 616 includes a window 616W slidingly disposed on the fence body 611. Window 616W is held in place between window holder 616H and fence body 611. Window holder 616H is in turn fixedly attached to the fence body 611 by screws 616S. The window 616W has two extensions 616E, preferably identical to each other, along the top and bottom thereof. These extensions slidingly catch hook portions of the window holder 616H and fence body 611 The window 616W also has a marker line 616L, preferably disposed off the center of window 616W.

Accordingly, if the user wants to adjust the indicated distance from the blade, the user need only to loosen screws 616S and slide the window 616W underneath holder 616H and fence body 611 along its longitudinal axis (which is parallel to direction Y shown in FIG. 33). Once the desired location has been obtained, the user need only to tighten the screws 616S, bringing holder 616H closer to fence body 611 and locking window 616W.

Persons skilled in the art will also recognize that the window 616W may also be installed on fence body 611 by inserting screws through slots disposed on the window 616W. This arrangement still allows adjustment of window 616W if so desired.

Preferably, the window 616W is symmetrical about its longitudinal axis. Accordingly, the user can rotate the window 616W 180° and still fit the holder 616H and the fence body 611. Having the marker line 616L disposed off-center in the window 616W is particularly advantageous because, when the user rotates the window 616W 180°, the line 616L will be on the other side of the center of the window 616W (see broken line 616L'). Accordingly, such arrangement provides a greater range of adjustment with the same side-to-side travel of a typical prior art pointer.

As seen in FIG. 34A, the window 616W may located above the rail 201, thus creating a gap therebetween. This prevents any damage caused to scale 203 due to friction, etc. If the user desires an exact reading on the distance between the fence and the blade, the user need only to push window 616W along direction X until the window 616W contacts the rail 201 (see broken line window 616W'). When the window 616W is released, it returns to its original position. Accordingly, the window 616W preferably is made of plastic or any other resilient material.

Figure 34B:
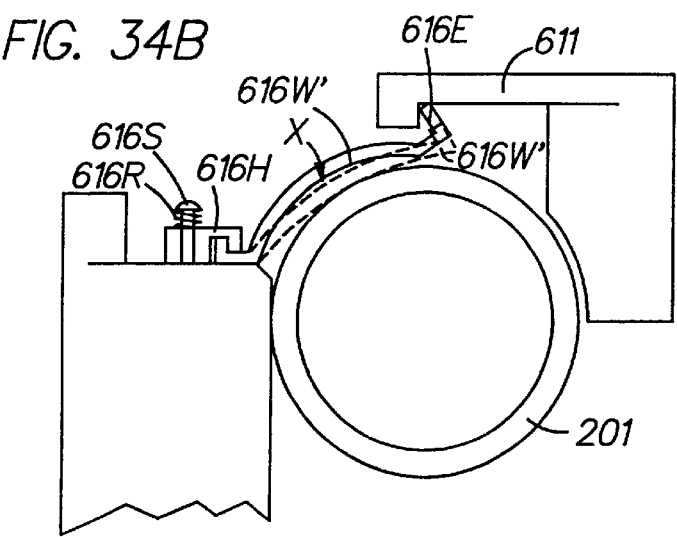
FIG. 34B is a cross-sectional view of a second embodiment of the window assembly.

Persons skilled in the art will recognize that a less resilient material can be used for the window 616W if a spring 616R or other resilient means is used to return the window 616W to its original position. As shown in FIG. 34B, the spring 616R is disposed between screw 616S and the holder 616H. Such arrangement will force the holder 616H downwardly and thus return the window 616W to its original position.

Figure 16:
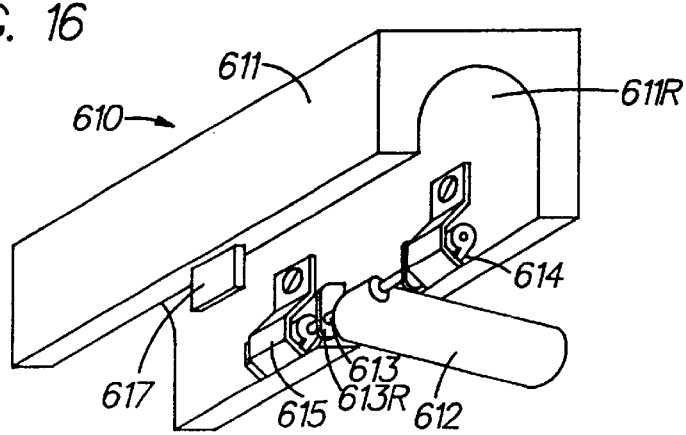
FIG. 16 is a rear perspective view of a fence head assembly.

Referring to FIGS. 16 and 17, the handle 612 may be connected to a rod 613. A cam 614 may be provided at both ends of the rod 613. A respective pressure plate 615 is provided for each cam 614. Accordingly, as shown in FIG. 17, when the handle 612 is rotated, the cam 614 forces the pressure plate 615 against the rail 201R, securely locking the fence head assembly 610 in place. However, when the cam 614 is disengaged, the plate 615 return to its original position because of its resiliency and the entire fence head assembly 610 can easily be removed by lifting it off the rail 201R.

Having two cams also guarantees that the fence head assembly 610 will lock the rail 201R in at least three lock points, even when the fence head assembly 610 partly extends beyond the rail 201R, as shown in FIG. 18. Preferably rod 613 is about four inches long, while each cam 614 is about one inch long. As shown in FIG. 17, the fence head assembly 610 has the receiving portion 611R contacting the rail 201R. As explained above, the pressure plate 615 contact the rail 201R when the cam 614 is actuated via handle 612. Accordingly, the combination of the receiving portion 611R with the pressure plate 615 will ensure that the fence head assembly 610 securely contacts the rail 201R in at least three points, even when the fence head assembly 610 partly extends beyond the rail 201R. This arrangement allows for longer rip capacity with shorter rails.

Another embodiment of the fence head assembly 610 is shown in FIGS. 29–31, where like parts have like numerals. A difference between the embodiment described above and the present embodiment is that a spring 615S is disposed between the plate 615 and the screw 615B attaching the plate 615 to the fence head body 611. The spring 615S biases the plate 615 towards a non-locking position, i.e., a position where the plate 615 and the rail 201 do not contact. Accordingly, when the user unlocks the fence head assembly 610, the spring 615S forces the plate 615 to its original position. Such arrangement allows the use of a heavier-gauge material for plate 615 for longer durability. In addition, such arrangement may prevent movement of handle 612 when the fence head assembly 610 is unlocked.

Another difference between the present embodiment and the previous embodiment is that the rod 613' has a square cross-section, which is less expensive than circular cross-sections, etc. Because of the square cross-section, a different means for facilitating rotational movement of the rod 613' must be used, as the rod 613' will not contact and easily rotate within a rib 613R as shown in FIG. 16. Accordingly, the cams 614 have circular extensions 614E on both sides. The extensions 614E ride within ribs 614R.

In addition, the cams 614 have a channel 614C for receiving the square rod 613'. Preferably, channel 614C has a square cross-section and has at least one pin extension 614P therein for securely holding the rod 613' therein. Preferably, the channel 614C has two pin extensions 614P on contiguous walls. Such arrangement allows for easy assembly by forcing the cam 614 onto the rod 613'. The pin extensions 614P would then slightly deform to match the dimensions of rod 613' and to securely hold the rod 613' therein. Having deformable pin extensions allows the use of different rod sizes created by tolerance variances during manufacture of the rod.

A ring 613RR surrounds rod 613'. A screw 612S at the end of handle 612 is then threaded into a bore of ring 613RR until it contacts rod 613'.

Yet another embodiment of the fence head assembly 610 is shown in FIGS. 44 and 30–32, where like parts have like numerals. Unlike the cam/rod assembly of FIG. 29, the fence head assembly has a long cam 614'. As shown in FIGS. 30–31, cam 614' has the same cross-sectional shape as cam 614. Handle 612 is preferably threadingly engaged to cam 614' via screw 612S. This arrangement in effect provides the advantages of having two cams and plates locking the fence head, while being less expensive to manufacture.

As shown in FIGS. 16–18, the fence head assembly 610 may have a protrusion 617 that contacts a stop 201P on rail 201R. This arrangement prevents an user from pushing the fence head assembly 610 too far and off the rail 201R.

As shown in FIG. 25, the stop 201P may be inserted in a hole 201H. If the user prefers not having a stop, the user needs only to remove the stop 201P. Persons skilled in the art will recognize that a plurality of holes may be provided along rail 201P at regular intervals. In this manner, the user can place the stop 201P in a desired location, so that the fence assembly 600 cannot be moved beyond the stop.

Alternatively, the stop 201P may be pivotably disposed in an aperture 201A on rail 201R, as shown in FIGS. 26–28. The stop 201P pivots about pin 201B so that, in a first position, the stop 201P can stop the fence assembly 600 and, in a second position, it pivots into the aperture 201A, allowing the fence assembly 600 to bypass the stop 201P. Preferably, the stop 201P is supported on one side by wall 201W, so that the stop 201P cannot pivot beyond a certain point. The stop 201P may have a carved protrusion 201PP. The wall 201W may also have a channel 201C, which provides enough clearance for pivoting the protrusion 201PP and thus the stop 201P. Persons skilled in the art will recognize that a plurality of stops may be provided along rail 201P at regular intervals. In this manner, the user can select which stops should be pivoted, so that the fence assembly 600 cannot be moved beyond the stops.

Fence Beam Assembly 650

Figure 20:
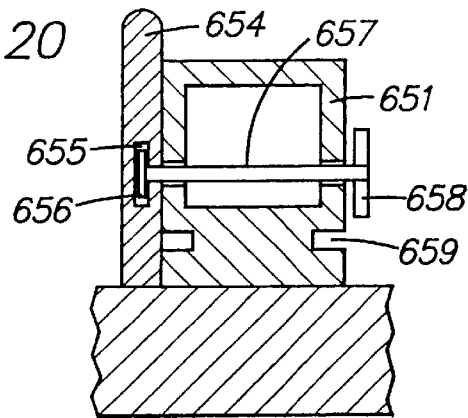
FIG. 20 is a partial cross-sectional view along line X—X in FIG. 15.

Referring to FIGS. 14–15 and 19–20, the fence beam assembly 650 has a body 651. Preferably, the body 651 is made of extruded aluminum and has a hollow core as shown in FIG. 20. Alternatively, the body 651 may be made of steel.

A semi-circular plate 652 may be connected to the fence beam 651. The plate 652 is attached to the fence head body 611 via screws 653. Screws 653 can be directly screwed onto fence head body 611 or onto nuts 653N attached underneath fence head body 611 (see FIG. 29). By loosening the screws 653, the plate 652 can be rotated to adjust the angle of the fence beam 651 relative to saw blade 104 and/or to obtain parallelism with saw blade 104. The user would then tighten the screws 653 to hold the plate 652 in place.

A fence face 654 may be slidably attached to the fence beam 651 in order to permit movement of the face 654 along the length of the fence beam 651. The face 654 has a channel 655 provided within to hold a T-nut or sliding strip 656. The nut or strip 656 is connected to a bolt 657 and knob 658 for securing the face 654 in place. Preferably, one strip 656 connects all bolts 657. If so desired, a user can take off the face 654 and install it on the other side of the fence beam 651 by removing the bolts 657 and knobs 658 and inserting them from the opposite side. Preferably, the face 654 is three-quarters of an inch wide.

It may also be preferable to make the channel 655 tall so that the fence face 654 can be moved vertically. This will allow the user to lower the face 654 until it contacts the table 103, leaving no gap between the table 103 and the face 654.

Persons skilled in the art should recognize that a cam can be used instead of bolt 657. For example, as shown in FIG.

51, beam 663 may have a hollow core made of extruded aluminum. A fence face 654 may be slidably attached to the fence beam 651. The face 654 has a channel 655 provided within to hold a sliding strip 662. The strip 662 may be connected to a link 660, which may be insert molded into a knob 658. A retainer clip 661 maintains strip 662 on bolt 660. Knob 658 has cams 664 which ride along surfaces 665 on beam 663. With such construction, the user need only rotate the knob 658 about 90° in order to lock the face 654 in place.

Referring to FIGS. 14 and 19–20, the fence beam 651 preferably has a groove 659 on its sides. A sheet of laminate can then be inserted in the groove 659 and slid along the fence length to perform a rip cut. Preferably, the groove 659 is about one-quarter of an inch deep, i.e., one inch from the fence face 654.

The fence beam 651 may also have a hole 651H for receiving a tool, as shown in FIG. 19.

Figure 15:
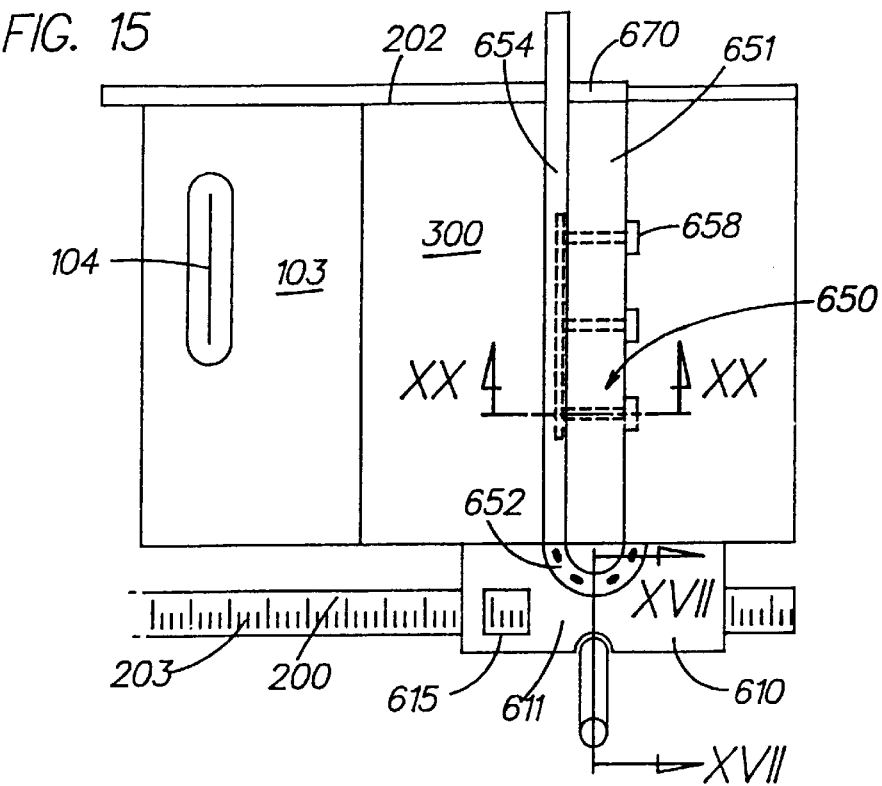
FIG. 15 is a partial top plan view of the table saw of FIG. 1.

As shown in FIGS. 14–15, an end cap 670 is provided at the distal end of the fence beam 651. The cap 670 has a lower lip 671 which engages rear rail 202. Because of this arrangement, the fence assembly 600 can slide along the rail 202. A gap can also be provided between the lower lip 671 and the rear rail 202 so that, if any upwardly vertical force L is encountered, the fence beam 651 will move upward until the lip 671 contacts the rear rail 202. Preferably, the lip 671 can be vertically adjusted so that the user can set the desired clearance.

In addition, the cap 670 has flat portion 672 that enables the user to secure the fence assembly 600 to the table 104 with a clamp 675, if so desired.

Figure 52:
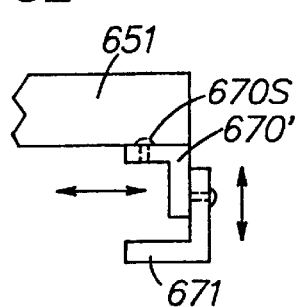
FIG. 52 is a partial side view of a second embodiment of a cap.

FIGS. 52 and 53 show alternate embodiments of cap 670, where like numerals refer to like parts. In FIG. 52, beam 651 has a cap 670' disposed thereon. Preferably cap 670' can slide along the longitudinal axis of beam 651. Screws 670S are used to fixedly attach the cap 670' to the beam 651. Preferably slots (not shown) are provided on beam 651 to provide access to and allow tightening of screws 670S. Lip 671 is provided on cap 670' as in the previous embodiment.

Figure 53A:
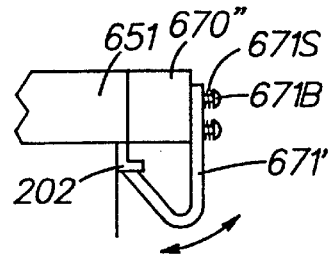
FIGS. 53A and 53B are partial side views of spring-loaded caps.
Figure 53B:
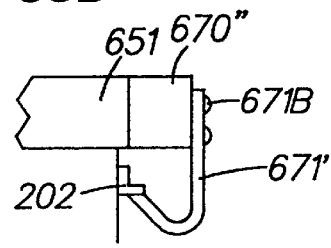

In FIGS. 53A and 53B, a cap 670" is provided on beam 651. Lip 671' is attached to cap 670" via bolts 671B. Preferably the engaging portion of lip 671' is inclined upwardly. When the fence beam 651 is dropped onto the table, the lip 671' moves downwardly. When the rear rail 202 contacts the lip 671', it pushes the lip 671' outwardly. When the end of lip 671' bypasses rail 202, the lip 671' moves underneath of rail 202. Such action can be obtain by providing a resilient lip 671 (as shown in FIG. 53B), or assisting the movement with springs 671S (which could be disposed between lip 671' and bolts 671B, as shown in FIG. 53A).

Another embodiment of the fence beam assembly 650 is shown in FIG. 45, where like parts have like numbers. Unlike the embodiment of FIGS. 14–15, the fence head 611 has a beam receiving portion 651BR fixedly attached thereto. The fence beam 651' is then bolted onto receiving portion 651BR via screws 653'. The screws 653' extend through oversized holes or slots 651S disposed on the beam 651'. This provides for angular adjustability of the fence beam. A plaque may be disposed between screws 653' and beam 651' to prevent dust from entering into beam 651' through slots 651S. Persons skilled in the art will recognize that other means may be used for providing angular adjustment of the fence beam.

Fence Detent Mechanism 800

Another aspect of the invention is the novel detent mechanism that is comprised by the detent/scale assembly 810 disposed on the rail 201R and the latch assembly 830 disposed on the fence head assembly 610. The advantage of this detent mechanism will be explained below.

Figure 21:
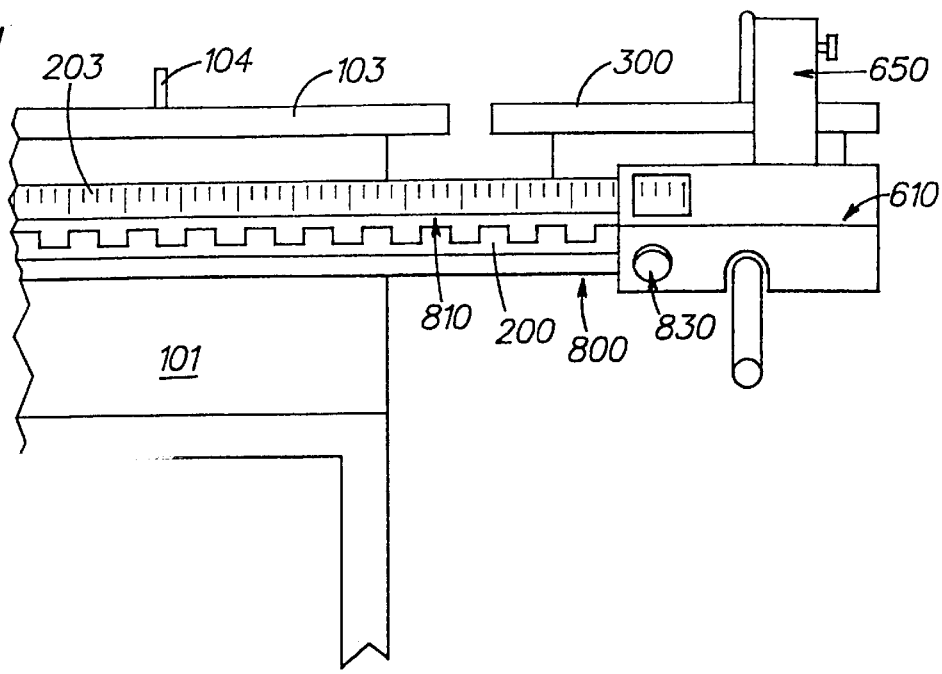
FIG. 21 is a partial front view of a table saw incorporating a novel fence detent mechanism.
Figure 22:
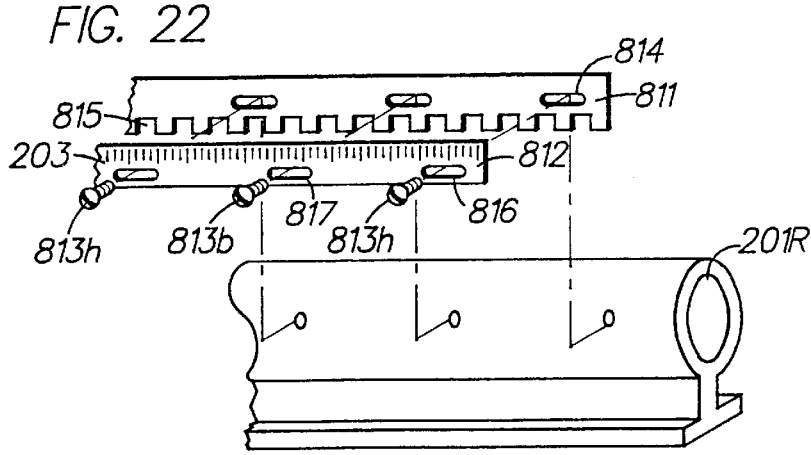
FIG. 22 is an exploded view of a rail incorporating the fence detent mechanism of FIG. 21.

Referring to FIGS. 21–22, the detent/scale mechanism 810 may include a detent plate 811, preferably made of stainless steel, slidingly disposed on the rail 201R. The detent plate 811 is held on the rail 201R by a set of screws 813h and 813b. A set of corresponding slots 814 is provided on the detent plate 811 so that a user can slide the detent plate 811 relative to the rail 201R along the slots 814. The detent plate 811 also has notches 815 disposed at the outer edge of the detent plate. These notches 815 are disposed at select locations of the detent plate 811, preferably at every inch along the length of the rail 201R.

A scale plate 812, preferably made of stainless steel, is slidingly disposed on the detent plate 811. As seen in FIGS. 21–22, a scale 203 may be provided on the scale plate 812 to indicate, in conjunction with fence head window assembly 616, the position of the fence assembly 600 relative to the saw blade 104. The scale plate 812 may be held in place by the screws 813h. The scale plate 812 may have a set of slots 816, which correspond to screws 813h. These slots 816 allow the user to slide the scale plate 812 relative to rail 201R and/or the detent plate 811.

The scale plate 812 may also have a second set of oversized slots 817, which completely bypass the screws 813b. Accordingly, the screws 813b do not contact or hold the scale plate 812. These slots 817 allow the user to adjust the scale plate 812 relative to rail 201R and/or the detent plate 811 without adjusting the detent plate 811. This arrangement also allows the user to adjust the detent plate 811 without adjusting the scale plate 812.

Figure 23:
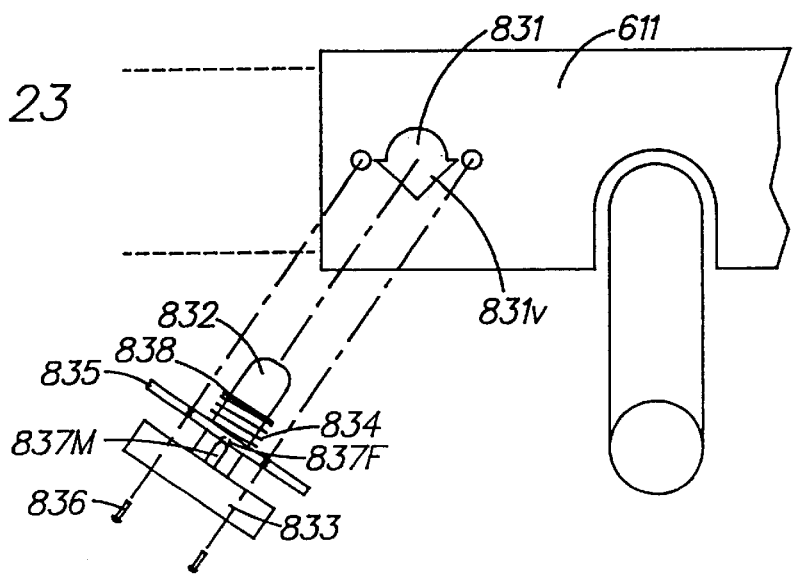
FIG. 23 is a partial exploded view of a pin assembly in the fence head assembly.

Referring to FIGS. 21 and 23, the latch assembly 830 is disposed on the fence head body 611. A hole 831 slidingly receives a pin 832. The pin 832 is connected to a knob 833, so that a user can slide the pin 832 in and out of hole 831. The hole 831 may be round. Preferably, the hole 831 has V-shaped lower portion 831v. In addition, a spring 834 may be connected between the pin 832 and a holding plate 835, normally biasing the pin 832 towards the detent plate 811. The holding plate 835 may be fixedly attached to the fence head body 611 via screws 836. A limit plate 838 prevents the pin 832 from being pulled beyond the holding plate 835.

A detent 837M may be provided on the pin 832. The holding plate 835 has a notch (not shown) that allows the detent 837M to bypass the holding plate 835, thus allowing the pin 832 to contact the detent plate 811. The holding plate 835 also has at lease one detent notch 837F disposed about 90° from the notch. Accordingly, if a user pulls out and rotates the pin 832 about 90°, the detent 837M engages the detent notch 837F, holding the pin 832 is held in a retracted position (away from the detent plate 811).

Figure 24:
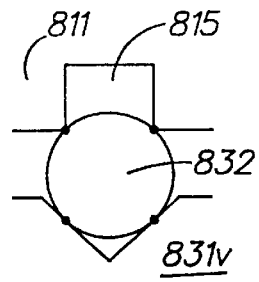
FIG. 24 shows the contact points on the pin of the pin assembly of FIG. 23.

As shown in FIG. 24, the pin 832 may engage a notch 815 of detent plate 811. It is thus beneficial to place, or "program", the notches 815 on the detent plate 811 to correspond with commonly desired distances, i.e., the distances between the fence assembly 600 and the saw blade 104. For example, the notches 815 may be placed at every inch along the length of the detent plate 811. Accordingly, if the user wants to quickly and accurately find the ten-inch detent, the user need only to pull out the pin 832, move the fence head body 611 towards the ten inch mark as indicated by scale 203, and to let go of the pin 832. Because the pin 832 is normally biased towards the extended position, the user can continue moving the fence head body 611 towards the ten inch mark until the pin 832 engages the corresponding ten inch notch 815.

The mechanism described above minimizes the "play" in the pin, providing a more accurate distance setting. This is achieved by limiting the number of contact lines between the detent plate 811 and pin 832 and between hole 831 and pin 832. The total number of contact lines is less than infinity and is preferably between 3 and 10. Because of the limited number of contact lines, a "tighter" contact with less play can be obtained. As shown in FIG. 24, the pin 832 is contacted in 4 different lines by the detent plate 811 and the hole 831v. This limits the range of movement, or "play", that the pin 832 may otherwise have.

Persons skilled in the art may also recognize other alternatives to the means disclosed herein. However, all these additions and/or alterations are considered to be equivalents of the present invention.

We claim:

1. A saw comprising:

a base assembly comprising a base and a table supported by the base;

a first rail attached to the base assembly, the first rail having a longitudinal axis;

a second rail attached to the base assembly and connected to the cross-cut table; and a subpanel disposed on the first and second rails, wherein said subpanel is horizontally movable with respect to said first and second rails;

a cross-cut table slidably attached to said subpanel, the cross cut table being slidable in a sliding direction substantially perpendicular to the longitudinal axis of the first rail and wherein said cross-cut table is adjustable along a vertical axis relative to said first and second rails.

2. The saw of claim 1, wherein the table has a groove for receiving a miter gauge.

3. The saw of claim 2, wherein the table has a locking mechanism for locking the miter gauge in a selected position in the groove.

4. The saw of claim 2, further comprising a plate movably disposed on the table, the plate being movable between a first position locking the miter gauge in a selected position in the groove, and a second position unlocking the miter gauge.

5. The saw of claim 1, flirt her comprising at least one slide assembly fixedly disposed between the subpanel and the cross-cut table.

6. The saw of claim 1, wherein said subpanel is vertically movable respective to said first rail.

7. The saw of claim 1, wherein said subpanel is horizontally movable respective to the table.

8. The saw of claim 1, wherein the second rail has a longitudinal axis parallel to the longitudinal axis of the first rail.

9. The saw of claim 1, wherein the sliding direction is adjustable by moving the subpanel relative to the table.

* * * * *